(12) United States Patent
Nishikido et al.

(10) Patent No.: US 12,204,045 B2
(45) Date of Patent: Jan. 21, 2025

(54) ELECTRONIC DEVICE, CONTROL METHOD OF ELECTRONIC DEVICE, AND CONTROL PROGRAM OF ELECTRONIC DEVICE

(71) Applicant: KYOCERA Corporation, Kyoto (JP)

(72) Inventors: Masamitsu Nishikido, Yokohama (JP); Satoshi Kawaji, Yokohama (JP); Masayuki Sato, Yokohama (JP); Takuya Homma, Yokohama (JP); Tooru Sahara, Yokohama (JP); Youhei Murakami, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 828 days.

(21) Appl. No.: 17/282,338

(22) PCT Filed: Sep. 26, 2019

(86) PCT No.: PCT/JP2019/037919
§ 371 (c)(1),
(2) Date: Apr. 1, 2021

(87) PCT Pub. No.: WO2020/071243
PCT Pub. Date: Apr. 9, 2020

(65) Prior Publication Data
US 2021/0349181 A1   Nov. 11, 2021

(30) Foreign Application Priority Data

Oct. 5, 2018 (JP) ................... 2018-190428

(51) Int. Cl.
*G01S 13/42* (2006.01)
*G01S 7/40* (2006.01)
*G01S 13/931* (2020.01)

(52) U.S. Cl.
CPC ............... *G01S 7/40* (2013.01); *G01S 13/42* (2013.01); *G01S 13/931* (2013.01)

(58) Field of Classification Search
CPC .......... G01S 7/40; G01S 13/42; G01S 13/931; G01S 2013/0245; G01S 13/347
See application file for complete search history.

(56) References Cited

U.S. PATENT DOCUMENTS 4,631,710 A    12/1986  Yamaguchi et al.
6,856,277 B2    2/2005  Katayama et al.
(Continued)

FOREIGN PATENT DOCUMENTS

DE    10 2008 054 624 A1    6/2010
DE    10 2013 205 892 A1    10/2014
(Continued)

*Primary Examiner* — Matthew M Barker
(74) *Attorney, Agent, or Firm* — Studebaker & Brackett PC

(57) ABSTRACT

An electronic device comprises: a plurality of transmission antennas configured to transmit transmission waves; a plurality of reception antennas configured to receive reflected waves resulting from reflection of the transmission waves; and a controller configured to detect an object reflecting the transmission waves, based on a transmission signal transmitted as the transmission waves and a reception signal received as the reflected waves. The controller is configured to determine a band part used to transmit the transmission waves in a predetermined frequency band, depending on an incidence angle when the reception antennas receive the reflected waves.

10 Claims, 13 Drawing Sheets

(56) References Cited

U.S. PATENT DOCUMENTS

| | | | |
|---|---|---|---|
| 8,405,541 B2 | 3/2013 | Lee et al. | |
| 8,922,422 B2 | 12/2014 | Klar et al. | |
| 9,500,741 B2 | 11/2016 | Kishigami et al. | |
| 10,033,098 B2 | 7/2018 | Schoor | |
| 2006/0139205 A1* | 6/2006 | Raestad | H01Q 3/02 |
| | | | 342/75 |

FOREIGN PATENT DOCUMENTS

| | | |
|---|---|---|
| GB | 2228387 A | 8/1990 |
| JP | H11-328 A | 1/1999 |
| JP | 2004-101347 A | 4/2004 |
| JP | 2005-121496 A | 5/2005 |
| JP | 2007017294 A | 1/2007 |
| JP | 2008-249399 A | 10/2008 |
| JP | 2013-539022 A | 10/2013 |
| JP | 2015155883 A | 8/2015 |

* cited by examiner

FIG. 4
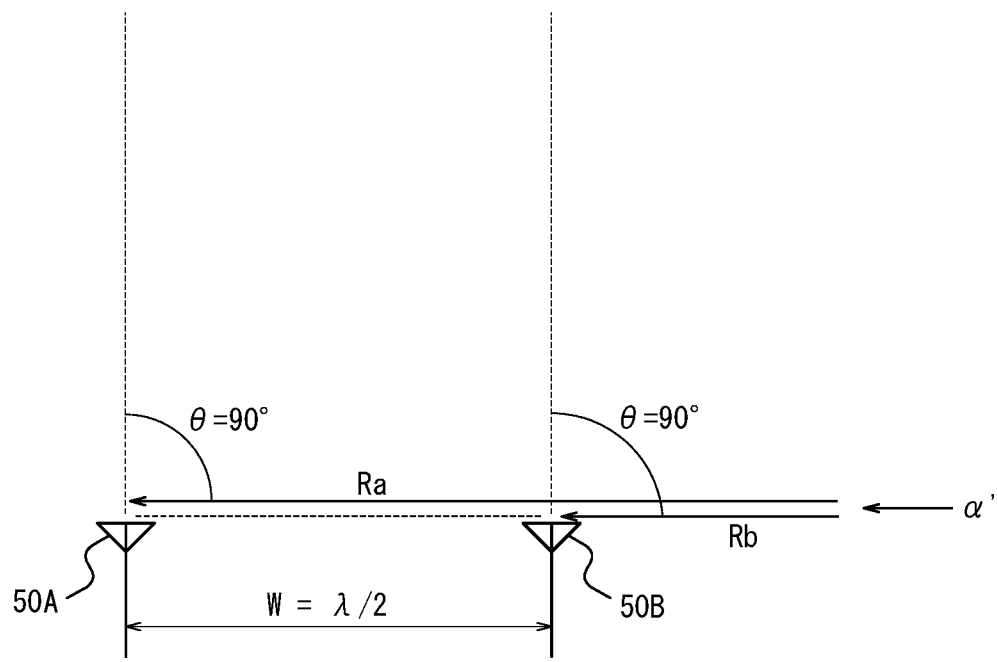
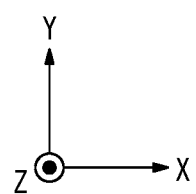

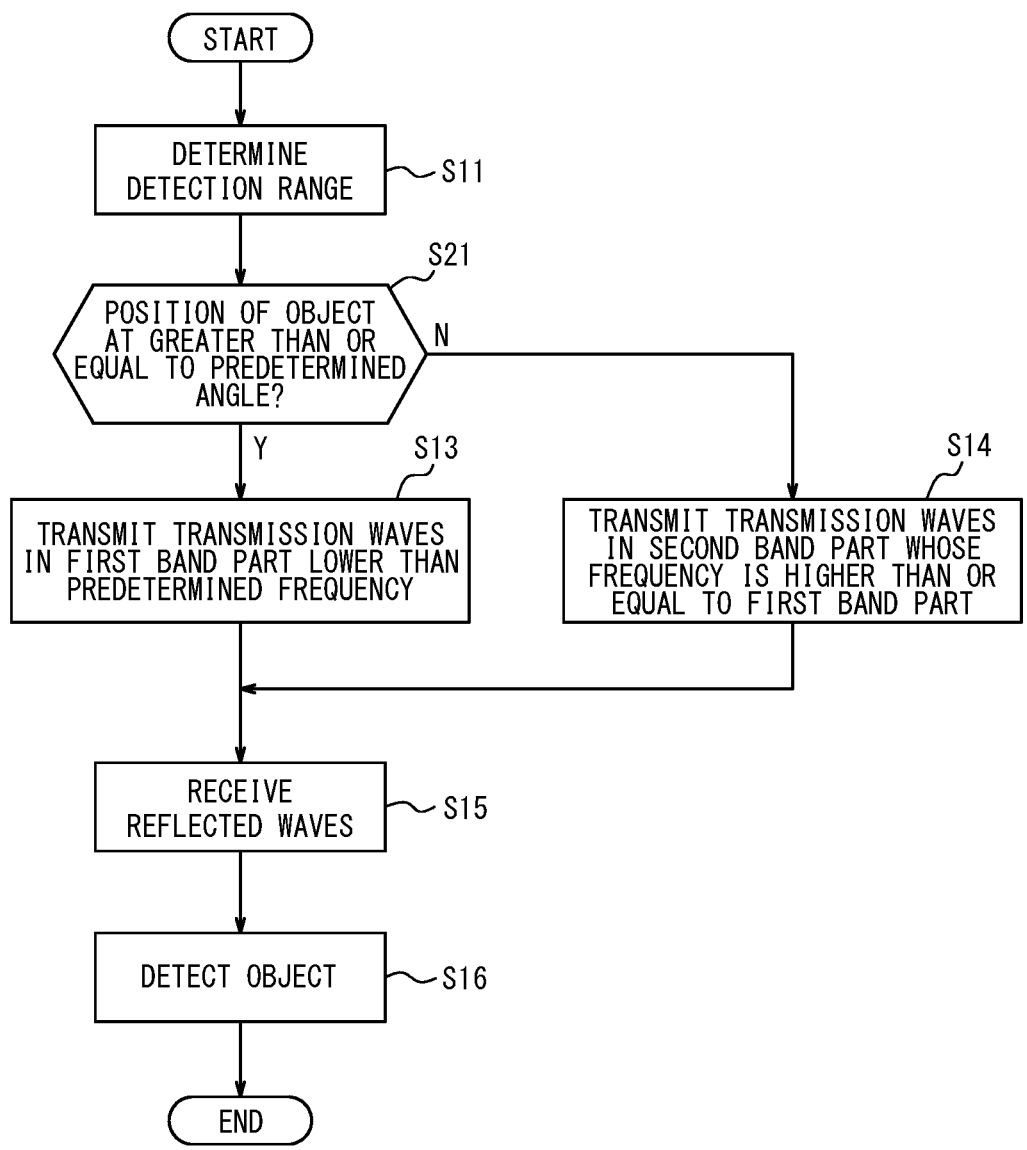

ELECTRONIC DEVICE, CONTROL METHOD OF ELECTRONIC DEVICE, AND CONTROL PROGRAM OF ELECTRONIC DEVICE

CROSS REFERENCE TO RELATED APPLICATION

This application claims priority to and the benefit of Japanese Patent Application No. 2018-190428 filed on Oct. 5, 2018, the entire disclosure of which is incorporated herein by reference.

TECHNICAL FIELD

The present disclosure relates to an electronic device, a control method of an electronic device, and a control program of an electronic device.

BACKGROUND

In fields such as automobile-related industry, techniques of measuring, for example, the distance between a vehicle and a certain object are considered important. In particular, various techniques of radar (radio detecting and ranging) that measures, for example, the distance from an object such as an obstacle by transmitting radio waves such as millimeter waves and receiving reflected waves reflected off the object are studied in recent years. The importance of such techniques of measuring distance and the like is expected to further increase in the future, with the development of techniques of assisting the driver in driving and techniques related to automated driving whereby driving is wholly or partly automated.

CITATION LIST

Patent Literature

PTL 1: JP 2015-155883 A

SUMMARY

An electronic device according to an embodiment comprises: a plurality of transmission antennas configured to transmit transmission waves; a plurality of reception antennas configured to receive reflected waves resulting from reflection of the transmission waves; and a controller configured to detect an object reflecting the transmission waves, based on a transmission signal transmitted as the transmission waves and a reception signal received as the reflected waves. The controller is configured to determine a band part used to transmit the transmission waves in a predetermined frequency band, depending on an incidence angle when the reception antennas receive the reflected waves.

A control method of an electronic device according to an embodiment comprises: (1) transmitting transmission waves from a plurality of transmission antennas; (2) receiving reflected waves resulting from reflection of the transmission waves, by a plurality of reception antennas; (3) detecting an object reflecting the transmission waves, based on a transmission signal transmitted as the transmission waves and a reception signal received as the reflected waves; and (4) determining a band part used to transmit the transmission waves in a predetermined frequency band, depending on an incidence angle when the reception antennas receive the reflected waves.

A control program of an electronic device according to an embodiment causes a computer to execute the foregoing (1) to (4).

BRIEF DESCRIPTION OF THE DRAWINGS

In the accompanying drawings:

FIG. 4 is a diagram illustrating an example of reflected waves received by the electronic device according to the embodiment;

FIG. 13 is a flowchart illustrating operation of the electronic device according to Embodiment 3.

DETAILED DESCRIPTION

Figure 1:
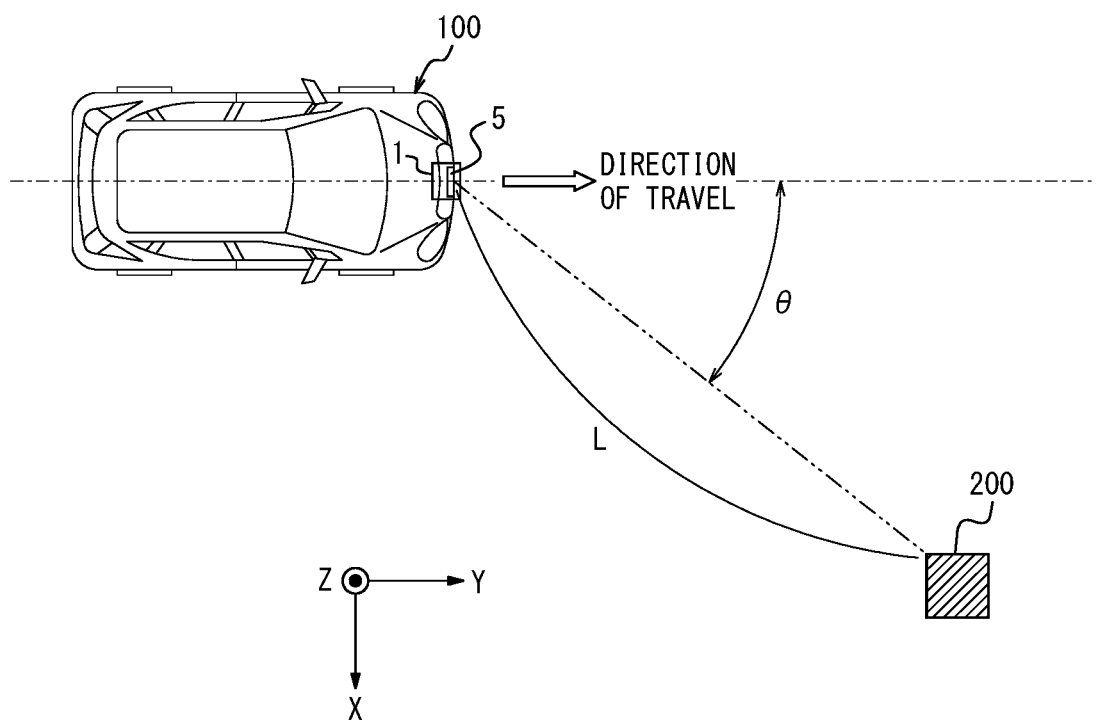
FIG. 1 is a diagram illustrating a use state of an electronic device according to an embodiment.

A technique (beamforming) of forming a beam of transmission waves transmitted from a plurality of transmission antennas is conventionally known in technical fields such as wireless communication. With beamforming, a beam of transmission waves transmitted from a plurality of transmission antennas can be formed in a predetermined direction to, for example, extend the reaching distance of radio waves. When forming the beam of the transmission waves transmitted from the plurality of transmission antennas, if the beam can be accurately aimed in a predetermined direction, the measurement accuracy (detection accuracy) of the distance from a surrounding object and the like can be improved. As an example of a technique of improving object detection accuracy, JP 2015-155883 A (PTL 1) proposes preventing erroneous estimation by a side lobe and a grating lobe when estimating the azimuth angle of an object using a reception array antenna. It could be helpful to provide an electronic device, a control method of an electronic device, and a control program of an electronic device that improve object detection accuracy. According to an embodiment, it is possible to provide an electronic device, a control method of an electronic device, and a control program of an electronic device that improve object detection accuracy. Some of the disclosed embodiments will be described in detail below, with reference to the drawings.

An electronic device according to an embodiment can be mounted in a vehicle (mobile body) such as a car (automobile) to detect a certain object around the mobile body. The electronic device according to the embodiment can transmit transmission waves to the surroundings of the mobile body from transmission antennas installed in the mobile body. The electronic device according to the embodiment can also receive reflected waves resulting from reflection of the transmission waves, by reception antennas installed in the mobile body. The transmission antennas and/or the reception antennas may be included in, for example, a radar sensor installed in the mobile body.

The following will describe a structure in which the electronic device according to the embodiment is mounted in a car (an example of a mobile body) such as a passenger car, as a typical example. The electronic device according to the embodiment is, however, not limited to being mounted in a car. The electronic device according to the embodiment may be mounted in various mobile bodies such as a self-driving car, a bus, a truck, a motorcycle, a bicycle, a ship, an airplane, a drone, a robot, and a pedestrian. The electronic device according to the embodiment is not limited to being mounted in a mobile body that moves with its own power. For example, the mobile body in which the electronic device according to the embodiment is mounted may be a trailer portion towed by a tractor. In a situation in which at least one of a sensor part and an object can move, the electronic device according to the embodiment can detect the object present around the sensor part and measure, for example, the distance between the sensor part and the object. The electronic device according to the embodiment can also measure, for example, the distance between the sensor part and the object when both the sensor part and the object are stationary.

An example of object detection by the electronic device according to the embodiment will be described below.

FIG. 1 is a diagram illustrating a use state of the electronic device according to the embodiment. FIG. 1 illustrates an example in which a sensor including transmission antennas and reception antennas according to the embodiment is installed in a mobile body.

A sensor 5 including transmission antennas and reception antennas according to the embodiment is installed in a mobile body 100 illustrated in FIG. 1. An electronic device 1 according to the embodiment is mounted (e.g. included) in the mobile body 100 illustrated in FIG. 1. A specific structure of the electronic device 1 will be described later. For example, the sensor 5 may include the transmission antennas and/or the reception antennas. The sensor 5 may include at least one of the other functional parts as appropriate, such as at least part of a controller 10 (FIG. 2) included in the electronic device 1. The mobile body 100 illustrated in FIG. 1 may be a vehicle of a car such as a passenger car. The mobile body 100 illustrated in FIG. 1 may be any type of mobile body. In FIG. 1, for example, the mobile body 100 may move (run or slow down) in the Y-axis positive direction (direction of travel) in the drawing, move in other directions, or be stationary without moving.

As illustrated in FIG. 1, the sensor 5 including a plurality of transmission antennas and a plurality of reception antennas is installed in the mobile body 100. In the example illustrated in FIG. 1, only one sensor 5 including transmission antennas and reception antennas is installed at the front of the mobile body 100. The position at which the sensor 5 is installed in the mobile body 100 is not limited to the position illustrated in FIG. 1, and may be any other position as appropriate. For example, the sensor 5 illustrated in FIG. 1 may be installed at the left, the right, and/or the back of the mobile body 100. The number of sensors 5 may be any number greater than or equal to 1, depending on various conditions (or requirements) such as the range and/or accuracy of measurement in the mobile body 100.

The sensor 5 transmits electromagnetic waves from the transmission antennas, as transmission waves. For example, in the case where there is a certain object (e.g. an object 200 illustrated in FIG. 1) around the mobile body 100, at least part of the transmission waves transmitted from the sensor 5 is reflected off the object to become reflected waves. As a result of the reflected waves being received by, for example, a reception antenna of the sensor 5, the electronic device 1 mounted in the mobile body 100 can detect the object.

The sensor 5 including the transmission antennas may be typically a radar (radio detecting and ranging) sensor that transmits and receives radio waves. The sensor 5 is, however, not limited to a radar sensor. For example, the sensor 5 according to the embodiment may be a sensor based on a technique of lidar (light detection and ranging, laser imaging detection and ranging) by lightwaves. Such sensors may include, for example, patch antennas and the like. Since the techniques of radar and lidar are already known, detailed description is simplified or omitted as appropriate.

The electronic device 1 mounted in the mobile body 100 illustrated in FIG. 1 receives reflected waves of transmission waves transmitted from the transmission antennas in the sensor 5, by the reception antennas. Thus, the electronic device 1 can detect the object 200 present within a predetermined distance from the mobile body 100. For example, the electronic device 1 can measure the distance L between the mobile body 100 as the own vehicle and the object 200, as illustrated in FIG. 1. The electronic device 1 can also measure the relative speed of the mobile body 100 as the own vehicle and the object 200. The electronic device 1 can further measure the direction (arrival angle θ) in which the reflected waves from the object 200 reaches the mobile body 100 as the own vehicle.

The object 200 may be, for example, at least one of an oncoming car running in a lane adjacent to the mobile body 100, a car running parallel to the mobile body 100, and a car running ahead or behind in the same lane as the mobile body 100. The object 200 may be any object around the mobile body 100, such as a motorcycle, a bicycle, a stroller, a pedestrian, a guardrail, a median strip, a road sign, a sidewalk step, a wall, a manhole, and an obstacle. The object 200 may be moving or stopped. For example, the object 200 may be a car parked or stopped around the mobile body 100. In the present disclosure, examples of the object 200 detected by the electronic device 1 include not only non-living objects but also living objects such as humans and animals. In the present disclosure, the object 200 detected by the electronic device 1 includes a target such as a human, a thing, or an animal detected by radar technology.

For example, the sensor 5 installed at the front of the mobile body 100 can form a beam of transmission waves in front of the mobile body 100 (i.e. beamforming). Here, the electronic device 1 controls the phase of the transmission waves transmitted from each of the plurality of transmission antennas so that the transmission waves of the plurality of transmission antennas will be in phase with each other in the front direction of the mobile body 100 (Y-axis positive direction). Consequently, the plurality of transmission waves intensify each other in the front direction of the mobile body 100 (Y-axis positive direction) and form the radio wave beam. As mentioned above, the use of the beamforming technique can improve, for example, the accuracy in the measurement of the distance from the object detected using the transmission waves. Moreover, with beamforming, the reaching distance of the transmission waves can be extended.

The electronic device 1 can, by appropriately controlling the phases of the transmission waves transmitted from the plurality of antennas, change the direction of the beam of the transmission waves. The electronic device 1 can aim the beam of the transmission waves transmitted from the transmission antennas 40 in any of various directions, by appropriately changing the phases of the transmission waves. Thus, the electronic device 1 can measure the direction (arrival angle θ) in which the reflected waves from the object 200 reach the mobile body 100 as the own vehicle. With beamforming, the radiation direction of the transmission waves can be controlled to improve the measurement accuracy of the angle toward the object.

Figure 2:
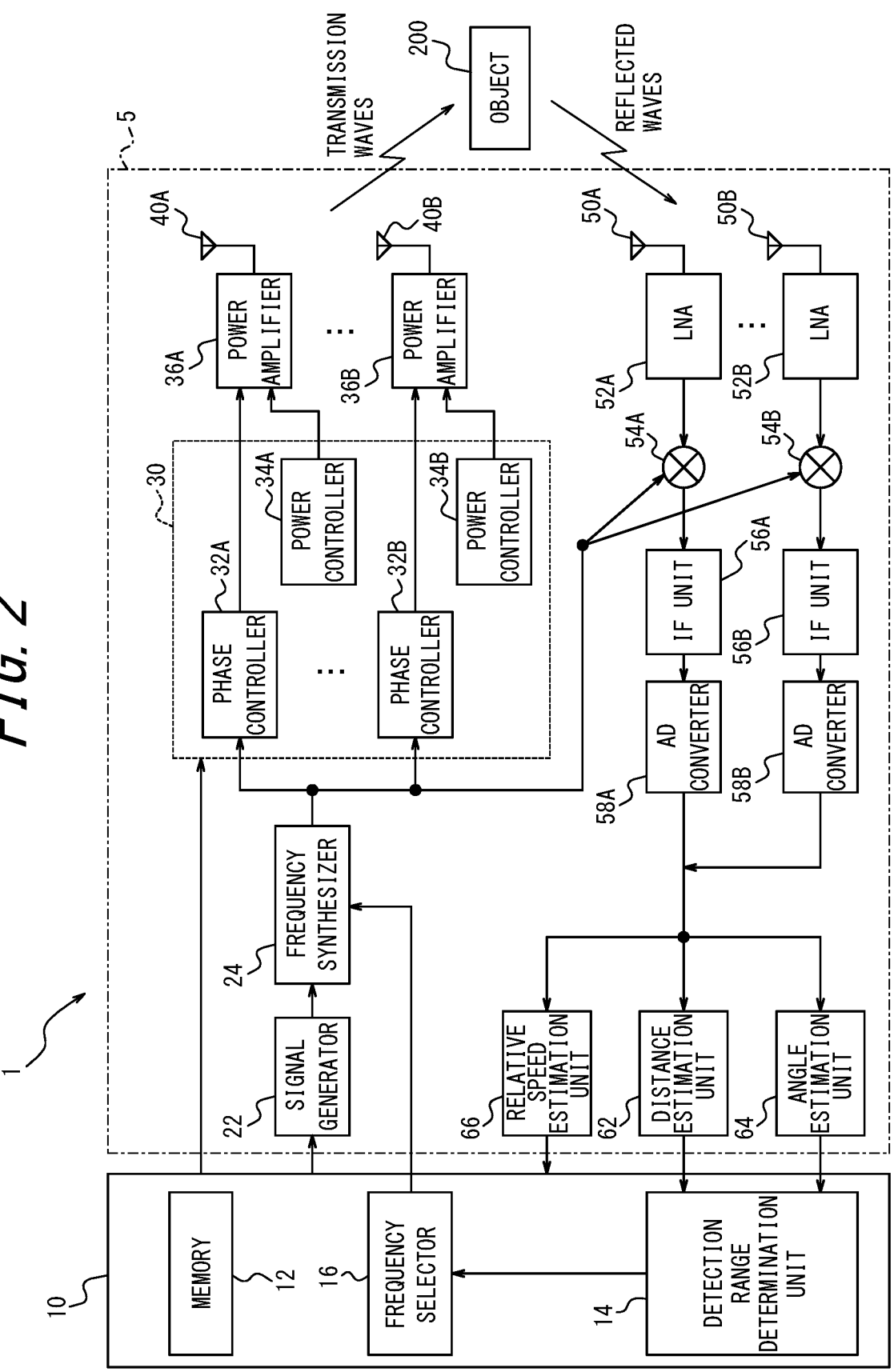
FIG. 2 is a functional block diagram schematically illustrating a structure of the electronic device according to the embodiment.

FIG. 2 is a functional block diagram schematically illustrating an example of the structure of the electronic device 1 according to the embodiment. The structure of the electronic device 1 according to the embodiment will be described below.

As illustrated in FIG. 2, the electronic device 1 according to the embodiment includes the sensor 5 and the controller 10. In the electronic device 1 illustrated in FIG. 2, one sensor 5 is connected to one controller 10. However, the electronic device 1 according to the embodiment may include any number of controllers 10 and any number of sensors 5. For example, in the electronic device 1 according to the embodiment, a plurality of sensors 5 may be connected to one controller 10. In FIG. 2, only one sensor 5 is illustrated in detail as a typical example of a plurality of sensors 5 that can be connected to the controller 10.

The electronic device 1 according to the embodiment may also include a signal generator 22, a frequency synthesizer 24, a transmission controller 30, power amplifiers 36A and 36B, and transmission antennas 40A and 40B. The sensor 5 may include at least the transmission antennas 40A and 40B. The sensor 5 may include one or more other functional parts such as the controller 10, the transmission controller 30, and the power amplifiers 36A and 36B. In the example illustrated in FIGS. 1 and 2, the sensor 5 and the controller 10 are illustrated as separate functional parts. Alternatively, the sensor 5 may include part or whole of the controller 10. The members included in the sensor 5 are not limited to the example illustrated in FIG. 2, and any of the members illustrated in FIG. 2 may be not included in the sensor 5. The transmission antennas 40A and 40B, reception antennas 50A and 50B, and the power amplifiers 36A and 36B may be contained in one housing as the sensor 5. It is assumed herein that the number of transmission antennas is 2 and the number of reception antennas is 2. In an embodiment, however, any number of two or more transmission antennas and any number of two or more reception antennas may be provided.

The electronic device 1 illustrated in FIG. 2 includes two transmission antennas 40A and 40B. Hereafter, in the case where the transmission antennas 40A and 40B are not distinguished from each other in the electronic device 1 according to the embodiment, they are collectively referred to as "transmission antenna 40". The electronic device 1 illustrated in FIG. 2 may include two functional parts of any of the other types (e.g. the power amplifiers 36A and 36B). In the case where such a plurality of functional parts of the same type are not distinguished from each other, the functional parts are collectively referred to by omitting symbols such as A and B.

The electronic device 1 according to the embodiment may further include the reception antennas 50A and 50B, LNAs 52A and 52B, mixers 54A and 54B, IF units 56A and 56B, AD converters 58A and 58B, a distance estimation unit 62, an angle estimation unit 64, and a relative speed estimation unit 66. For these functional parts, too, in the case where a plurality of functional parts of the same type are not distinguished from each other, the functional parts are collectively referred to by omitting symbols such as A and B. The sensor 5 may include the reception antennas 50A and 50B. The sensor 5 may include other functional parts such as the LNAs 52A and 52B.

The controller 10 included in the electronic device 1 according to the embodiment can control overall operation of the electronic device 1, including control of each of the functional parts included in the electronic device 1. The controller 10 may include at least one processor such as a central processing unit (CPU), to provide control and processing capacity for achieving various functions. The controller 10 may be implemented by one processor, by several processors, or by respective separate processors. Each processor may be implemented as a single integrated circuit (IC). Each processor may be implemented as a plurality of integrated circuits and/or discrete circuits communicably connected to one another. Each processor may be implemented based on any of other various known techniques. In an embodiment, the controller 10 may be implemented, for example, by a CPU and a program executed by the CPU.

As illustrated in FIG. 2, the controller 10 may include a memory 12, a detection range determination unit 14, and a frequency selector 16. The detection range determination unit 14 and the frequency selector 16 may each be configured as hardware having the function, configured as a microcomputer or the like, or configured as a processor such as a CPU and a program executed by the processor.

The memory 12 may store the program executed by the controller 10, results of processes performed by the controller 10, and the like. The memory 12 may function as a work memory of the controller 10. The memory 12 may be implemented, for example, by a semiconductor memory, a magnetic disk, or the like. The memory 12 is, however, not limited to such, and may be any storage device. For example, the memory 12 may be a storage medium such as a memory card inserted in the electronic device 1 according to the embodiment. The memory 12 may be an internal memory of the CPU used as the controller 10 as described above.

The detection range determination unit 14 determines a range of object detection by the transmission waves T transmitted from the transmission antennas 40 and the reflected waves R received by the reception antennas 50. In an embodiment, the detection range determination unit 14 may determine the object detection range based on estimation by at least one of a distance estimation unit 62 and an angle estimation unit 64. The determination of the object detection range by the detection range determination unit 14 will be described in detail later. The detection range determination unit 14 may notify the frequency selector 16 of the determined object detection range.

The frequency selector 16 determines the frequency of the transmission waves T transmitted from the transmission antennas 40. In an embodiment, for example, the frequency selector 16 selects a predetermined band part used to transmit the transmission waves T, in a predetermined frequency band prepared as a frequency band usable for detection. In an embodiment, the frequency selector 16 may select the predetermined band part used to transmit the transmission waves T, based on the detection range determined by the detection range determination unit 14. The selection of the predetermined band part by the frequency selector 16 will be described in detail later. The frequency selector 16 may notify the frequency synthesizer 24 of the selected frequency. In this case, the frequency synthesizer 24 can increase the frequency of the transmission waves T to a frequency in the predetermined frequency band selected by the frequency selector 16.

In the electronic device 1 according to the embodiment, the controller 10 can control the transmission controller 30. In this case, the controller 10 may control the transmission controller 30 based on various information stored in the memory 12. In the electronic device 1 according to the embodiment, the controller 10 may instruct the signal generator 22 to generate a signal, or control the signal generator 22 to generate a signal.

In the case where the mobile body 100 is a car, communication between electronic control units (ECUs) can be performed using a communication interface such as CAN (Controller Area Network). In this case, the controller 10 can acquire control information of the mobile body 100 from an ECU (e.g. a mobile body controller) or the like. Hence, in the electronic device 1 according to the embodiment, the controller 10 may determine a transmission wave transmission mode based on the acquired control information and the like. For example, the transmission wave transmission mode may be any of an operation mode (BF mode) in which beamforming is performed and an operation mode (normal mode) in which beamforming is not performed. The transmission wave transmission mode may be various settings in each of the modes. For example, the transmission wave transmission mode may define the number of transmission antennas (the number antennas) that transmit transmission waves in each of the modes. For example, the transmission wave transmission mode may define whether to perform beamforming and/or the angle of beamforming. Herein, the angle of beamforming may be an angle for increasing the gain of the beam for the installation location (position) of the transmission antennas 40 in the mobile body 100 in the case of performing beamforming.

Having determined the transmission mode, the controller 10 supplies setting information in the transmission mode to the transmission controller 30. The setting information in the transmission mode may include, for example, information of the number of transmission antennas that transmit transmission waves in the transmission mode. The setting information in the transmission mode may include, for example, information of the power with which the transmission antennas transmit transmission waves in the transmission mode. The setting information in the transmission mode may include, for example, information of the phase of transmission waves transmitted from each of the plurality of transmission antennas 40 in the case of performing beamforming.

For such operation, for example, a table or the like in which each transmission mode is associated with setting information necessary for operation in the transmission mode may be stored in the memory 12 beforehand. For example, transmission wave phase information when performing beamforming in a transmission mode may be stored in the memory 12 in association with the installation location (position) and installation angle of the transmission antenna 40 in the mobile body 100. In such a case, having determined the transmission mode, the controller 10 can read setting information corresponding to the determined transmission mode from the memory 12 and supply the setting information to the transmission controller 30.

To change the reaching distance of transmission waves T transmitted from the transmission antenna 40, for example, the transmission power of the transmission waves T may be adjusted to change the gain of the transmission antenna 40 and/or the gain of beamforming. In this case, the transmission power of the transmission waves T transmitted from the transmission antenna 40 and the gain of the transmission antenna 40 and/or the gain of beamforming may be stored in the memory 12 in association with each other.

The foregoing transmission modes and the setting information corresponding to each transmission mode may be generated as appropriate based on various conditions. In such a case, having determined the transmission mode, the controller 10 can supply the setting information corresponding to the determined transmission mode to the transmission controller 30, even when the setting information is not stored in the memory 12.

The signal generator 22 generates a signal (transmission signal) transmitted from the transmission antenna 40 as the transmission waves T, based on control by the controller 10. When generating the transmission signal, for example, the signal generator 22 assigns the frequency of the transmission signal based on control by the controller 10. For example, the signal generator 22 receives frequency information from the controller 10, and generates a signal of a predetermined frequency in a frequency band of 77 GHz to 81 GHz. The signal generator 22 may include a functional part such as a voltage controlled oscillator (VCO). Herein, "a GHz to b GHz" denotes a GHz or more and less than b GHz, where a and b are any numbers. Herein, "a GHz to b GHz" may denote more than a GHz and b GHz or less, where a and b are any numbers.

The signal generator 22 may be configured as hardware having the function, configured as a microcomputer or the like, or configured as a processor such as a CPU and a program executed by the processor. Each functional part described below may be configured as hardware having the function, or, if possible, configured as a microcomputer or the like or configured as a processor such as a CPU and a program executed by the processor.

In the electronic device 1 according to the embodiment, the signal generator 22 may generate a transmission signal such as a chirp signal. In particular, the signal generator 22 may generate a signal (linear chirp signal) whose frequency linearly changes periodically. For example, the signal generator 22 may generate a chirp signal whose frequency linearly increases periodically from 77 GHz to 81 GHz with time. For example, the signal generator 22 may generate a signal whose frequency periodically repeats a linear increase (up-chirp) and decrease (down-chirp) from 77 GHz to 81 GHz with time. The signal generated by the signal generator 22 may be, for example, set by the controller 10 beforehand. The signal generated by the signal generator 22 may be, for example, stored in the memory 12 beforehand. Since chirp signals used in technical fields such as radar are already known, more detailed description is simplified or omitted as appropriate. The signal generated by the signal generator 22 is supplied to the frequency synthesizer 24.

The frequency synthesizer 24 increases the frequency of the signal generated by the signal generator 22 to a frequency in a predetermined frequency band. The frequency synthesizer 24 may increase the frequency of the signal generated by the signal generator 22 to a frequency selected as the frequency of the transmission waves T transmitted from the transmission antenna 40. The frequency selected as the frequency of the transmission waves T transmitted from the transmission antenna 40 may be, for example, set by the controller 10. In an embodiment, the frequency synthesizer 24 may increase the frequency of the signal generated by the signal generator 22 to the frequency selected by the frequency selector 16. The frequency selected as the frequency of the transmission waves T transmitted from the transmission antenna 40 may be, for example, stored in the memory 12. The signal increased in frequency by the frequency synthesizer 24 is supplied to the transmission controller 30 and each mixer 54.

The transmission controller 30 performs control to transmit the transmission signal supplied from the frequency synthesizer 24 as the transmission waves T from at least one of the plurality of transmission antennas 40. As illustrated in FIG. 2, the transmission controller 30 may include phase controllers 32 and power controllers 34. As illustrated in FIG. 2, the transmission controller 30 may perform control to transmit the transmission signal from the transmission antenna 40 as the transmission waves T, based on control by the controller 10. Various information necessary for the controller 10 to control the transmission controller 30 may be stored in the memory 12.

Each phase controller 32 controls the phase of the transmission signal supplied from the frequency synthesizer 24. Specifically, the phase controller 32 may adjust the phase of the signal supplied from the frequency synthesizer 24 by advancing or delaying the phase of the signal as appropriate, based on control by the controller 10. In this case, based on the path difference between the respective transmission waves T transmitted from the plurality of transmission antennas 40, the phase controllers 32 may adjust the phases of the respective transmission signals. As a result of the phase controllers 32 adjusting the phases of the respective transmission signals as appropriate, the transmission waves T transmitted from the plurality of transmission antennas 40 intensify each other and form a beam in a predetermined direction (i.e. beamforming).

For example, in the case of transmitting the transmission waves T without beamforming in the normal mode, the phase controller 32 does not need to control the phase of the transmission signal transmitted as the transmission waves T from the transmission antenna 40. For example, in the case of performing beamforming of the transmission waves T in the BF mode, the phase controller 32 may control the phase of a corresponding one of the plurality of transmission signals transmitted from the plurality of transmission antennas 40 as the transmission waves T, depending on the beamforming direction. In this case, the correlation between the beamforming direction and the amount of phase to be controlled in the transmission signal transmitted from each of the plurality of transmission antennas 40 may be stored in, for example, the memory 12. The signal phase-controlled by the phase controller 32 is supplied to the corresponding power amplifier 36.

Each power controller 34 is connected to the corresponding power amplifier 36, as illustrated in FIG. 2. The power controller 34 controls the amplification of power by the power amplifier 36 connected to the power controller 34. By controlling the power amplifier 36, the power controller 34 controls the transmission power of the transmission waves T transmitted from the transmission antenna 40 connected to the power amplifier 36. For example, the power controller 34 can switch on and off the transmission power of the power amplifier 36 connected to the power controller 34. That is, the power controller 34 can switch whether to transmit the transmission waves T from the transmission antenna 40 connected to the power amplifier 36.

For example, the power controller 34A can switch on and off the transmission power of the transmission waves T transmitted from the transmission antenna 40A. The power controller 34B can switch on and off the transmission power of the transmission waves T transmitted from the transmission antenna 40B. Thus, the electronic device 1 can freely control whether to transmit the transmission waves T from the transmission antenna 40A and/or the transmission antenna 40B, based on control by both of the power controllers 34A and 34B. The power controller 34 may adjust the transmission power of the power amplifier 36 connected to the power controller 34, as appropriate. Thus, the power controller 34 can define the number of transmission antennas 40 from which the transmission waves T are transmitted from among the plurality of transmission antennas 40, for example based on the setting in the transmission mode. Various information necessary for control by the power controller 34 may be, for example, stored in the memory 12. For example, the memory 12 may store the correlation between the control by each power controller 34 and the transmission power of the transmission waves T transmitted from the corresponding transmission antenna 40. The memory 12 may store such correlation for each transmission mode.

The electronic device 1 according to the embodiment can set various transmission conditions of the transmission waves T transmitted from at least one of the plurality of transmission antennas 40, based on control by the phase controllers 32 and/or the power controllers 34 in the transmission controller 30. Specifically, the electronic device 1 according to the embodiment can set whether to perform beamforming, the beam direction in the case of performing beamforming, etc. In this case, for example, the memory 12 may store control information of the phase controllers 32 and/or the power controllers 34 corresponding to various transmission conditions of the transmission waves T. By reading the control information corresponding to the transmission conditions of the transmission waves T from the memory 12, the controller 10 enables the control of the transmission waves T by the phase controllers 32 and/or the power controllers 34. For example, in the case where the electronic device 1 operates in the normal mode (e.g. not performing beamforming), each power controller 34 controls the power when transmitting the transmission waves T depending on the antenna radiation gain of the corresponding transmission antenna 40. For example, in the case where the electronic device 1 operates in the BF mode (e.g. performing beamforming), each phase controller 32 appropriately changes the phase of the transmission signal transmitted from the transmission antenna used from among the plurality of transmission antennas 40. In an embodiment, when performing beamforming for the transmission waves T transmitted from a plurality of transmission antennas 40, the number of beams, the beam shape, etc. can be variously set based on control by the phase controllers 32 and the power controllers 34.

Each power amplifier 36 amplifies the power of the transmission signal supplied from the phase controller 32, based on control by the power controller 34. Since techniques of amplifying power of transmission signals are already known, more detailed description is omitted. The power amplifier 36 is connected to the transmission antenna 40.

Each transmission antenna 40 outputs (transmits) the transmission signal amplified by the power amplifier 36, as the transmission waves T. The sensor 5 may include a plurality of transmission antennas such as the transmission antennas 40A and 40B, as mentioned above. Since each transmission antenna 40 can be configured in the same way as transmission antennas used in known radar techniques, more detailed description is omitted.

Thus, the electronic device 1 according to the embodiment can transmit the transmission signal such as a chirp signal from the plurality of transmission antennas 40 as the transmission waves T. At least one of the functional parts included in the electronic device 1 may be contained in one housing having a structure that cannot be opened easily. For example, the transmission antennas 40A and 40B, the reception antennas 50A and 50B, and the power amplifiers 36A and 36B may be contained in one housing having a structure that cannot be opened easily. In the case where the sensor 5 is installed in the mobile body 100 such as a car, each transmission antenna 40 may transmit transmission waves T to outside the mobile body 100 through a member such as a radar cover. In this case, the radar cover may be made of a material that allows electromagnetic waves to pass through, such as synthetic resin or rubber. For example, the radar cover may be a housing of the sensor 5. By covering the transmission antennas 40 with a member such as a radar cover, the risk that the transmission antennas 40 break or become defective due to external contact can be reduced. The radar cover and the housing are also referred to as "radome" (the same applies hereafter).

The electronic device 1 illustrated in FIG. 2 includes two transmission antennas 40, e.g. the transmission antennas 40A and 40B, and transmits the transmission waves T by the two transmission antennas 40. Hence, the electronic device 1 illustrated in FIG. 2 includes two functional parts of the same type necessary for transmitting the transmission waves T from the two transmission antennas 40, for each type of functional part. Specifically, the transmission controller 30 includes two phase controllers 32, e.g. the phase controllers 32A and 32B. The transmission controller 30 also includes two power controllers 34, e.g. the power controllers 34A and 34B. The electronic device 1 illustrated in FIG. 2 also includes two power amplifiers 36, e.g. the power amplifiers 36A and 36B.

Although the electronic device 1 illustrated in FIG. 2 includes two transmission antennas 40, the number of transmission antennas 40 included in the electronic device 1 according to the embodiment may be any number greater than or equal to 2, e.g. three or more transmission antennas 40. In this case, the electronic device 1 according to the embodiment may include the same number of power amplifiers 36 as the plurality of transmission antennas 40. The electronic device 1 according to the embodiment may also include the same number of phase controllers 32 and the same number of power controllers 34 as the plurality of transmission antennas 40.

Each reception antenna 50 receives reflected waves R. The reflected waves R result from reflection of the transmission waves T off the object 200. The reception antennas 50 may include a plurality of antennas such as the reception antennas 50A and 50B. Since each reception antenna 50 can be configured in the same way as reception antennas used in known radar techniques, more detailed description is omitted. The reception antenna 50 is connected to the LNA 52. A reception signal based on the reflected waves R received by the reception antenna 50 is supplied to the corresponding LNA 52.

The electronic device 1 according to the embodiment can receive the reflected waves R as a result of the transmission waves T transmitted as the transmission signal such as a chirp signal being reflected off the object 200, by the plurality of reception antennas 50. At least one of the functional parts included in the electronic device 1, such as the plurality of reception antennas 50, may be contained in one housing having a structure that cannot be opened easily. In the case where the sensor 5 is installed in the mobile body 100 such as a car, each reception antenna 50 may receive the reflected waves R from outside the mobile body 100 through a member such as a radar cover. In this case, the radar cover may be made of a material that allows electromagnetic waves to pass through, such as synthetic resin or rubber. For example, the radar cover may be a housing of the sensor 5. By covering the reception antennas 50 with a member such as a radar cover, the risk that the reception antennas 50 break or become defective due to external contact can be reduced.

The sensor 5 may include, for example, all transmission antennas 40 and all reception antennas 50. In the case where a reception antenna 50 is installed near a transmission antenna 40, these antennas may be included in one sensor 5 in combination. For example, one sensor 5 may include at least one transmission antenna 40 and at least one reception antenna 50. For example, one sensor 5 may include a plurality of transmission antennas 40 and a plurality of reception antennas 50. In such a case, for example, one radar sensor may be covered with one member such as a radar cover.

Each LNA 52 amplifies a reception signal based on the reflected waves R received by the reception antenna 50, with low noise. The LNA 52 may be a low-noise amplifier, and amplifies the reception signal supplied from the reception antenna 50 with low noise. The reception signal amplified by the LNA 52 is supplied to the corresponding mixer 54.

Each mixer 54 mixes (multiplies) the reception signal of RF frequency supplied from the LNA 52 and the transmission signal supplied from the frequency synthesizer 24, to generate a beat signal. The beat signal generated by the mixer 54 is supplied to the corresponding IF unit 56.

Each IF unit 56 performs frequency conversion on the beat signal supplied from the mixer 54, to lower the frequency of the beat signal to intermediate frequency (IF). The beat signal lowered in frequency by the IF unit 56 is supplied to the corresponding AD converter 58.

Each AD converter 58 digitizes the analog beat signal supplied from the IF unit 56. The AD converter 58 may include any analog-to-digital converter (ADC). The beat signal digitized by the AD converter 58 is supplied to the distance estimation unit 62 in the case where the number of reception antennas 50 is one, and supplied to the distance estimation unit 62 and the angle estimation unit 64 in the case where the number of reception antennas 50 is two or more.

The distance estimation unit 62 estimates the distance between the mobile body 100 having the electronic device 1 mounted therein and the object 200, based on the beat signal supplied from the AD converter 58. The distance estimation unit 62 may include, for example, a FFT processor. The FFT processor may be composed of any circuit, chip, or the like for performing fast Fourier transform (FFT) processing. The FFT processor performs FFT processing on the beat signal digitized by the AD converter 58. For example, the distance estimation unit 62 may perform FFT processing on the complex signal supplied from the AD converter 58. In the case where the peak of the result obtained by the FFT processing is greater than or equal to a predetermined threshold, the distance estimation unit 62 may determine that the object 200 is present at distance corresponding to the peak. Information of the distance estimated by the distance estimation unit 62 may be, for example, supplied to the controller 10.

The angle estimation unit 64 estimates the direction from the mobile body 100 having the electronic device 1 mounted therein toward the object 200 (i.e. the direction in which the reflected waves R reach the reception antenna 50), based on the beat signal supplied from the AD converter 58. The angle estimation unit 64 may include, for example, a FFT processor, as with the distance estimation unit 62. As mentioned above, the distance estimation unit 62 may perform FFT processing on the complex signal supplied from the AD converter 58, and, in the case where the peak of the result obtained by the FFT processing is greater than or equal to the predetermined threshold, determine that the object 200 is present at distance corresponding to the peak. In this case, the angle estimation unit 64 may estimate the direction in which the reflected waves R reach the reception antenna 50 (i.e. the direction from the object 200 toward the reception antenna 50), based on the result of receiving the reflected waves R from the object 200 by the plurality of reception antennas 50. The direction in which the reflected waves R reach the reception antennas 50, which is estimated by the angle estimation unit 64, may be the direction from the object 200 toward the reception antennas 50. Information of the direction (the direction of arrival or the angle of arrival) estimated by the angle estimation unit 64 may be, for example, supplied to the controller 10.

The relative speed estimation unit 66 estimates the relative speed of the object 200 and the mobile body 100, based on the beat signal.

Typically, a frequency spectrum can be obtained by performing FFT processing on the beat signal. From such a frequency spectrum, the FFT processor can estimate whether the object 200 is present within the range of the beam of the transmission waves T transmitted from the transmission antenna 40. That is, the FFT processor can estimate whether the object 200 is present within the range of the beam emitted from the sensor 5 including the transmission antenna 40, based on the FFT-processed beat signal. In the case where the object 200 is present, the FFT processor can estimate the distance between the sensor 5 including the transmission antenna 40 and the object 200, based on the FFT-processed beat signal. Further, in the case where the object 200 is present, the FFT processor can estimate the positional relationship between the sensor 5 including the transmission antenna 40 and the object 200, based on the FFT-processed beat signal. In the distance estimation unit 62, the angle estimation unit 64, and the relative speed estimation unit 66, a Fourier transform other than a fast Fourier transform (FFT) may be performed.

Thus, the electronic device 1 according to the embodiment may measure (estimate) the distance between the object 200 and the mobile body 100, based on the beat signal obtained from the signal transmitted as the transmission waves T and the signal received as the reflected waves R. The electronic device 1 according to the embodiment may also measure (estimate) the positional relationship between the object 200 and the mobile body 100 (e.g. the angle of arrival at which the reflected waves R reach the mobile body 100 from the object 200), based on the beat signal. The electronic device 1 according to the embodiment may further measure (estimate) the relative speed of the object 200 and the mobile body 100, based on the beat signal. The controller 10 may perform various computation, estimation, control, and the like, using the information of the distance supplied from the distance estimation unit 62, the information of the direction (angle) supplied from the angle estimation unit 64, and the like. Since the technique of estimating the distance, direction, etc. to a certain object from which reflected waves are reflected based on a beat signal acquired using millimeter wave radar of 79 GHz band or the like is known, more detailed description is omitted.

The electronic device 1 illustrated in FIG. 2 includes two reception antennas 50, e.g. the reception antennas 50A and 50B, and receives the reflected waves R by the two reception antennas 50. Hence, the electronic device 1 illustrated in FIG. 2 includes two functional parts of the same type necessary for receiving the reflected waves R by the two reception antennas 50. Specifically, the transmission controller 30 includes two LNAs 52, two mixers 54, two IF units 56, and two AD converters 58.

Although the electronic device 1 illustrated in FIG. 2 includes two reception antennas 50, the number of reception antennas 50 included in the electronic device 1 according to the embodiment may be any number greater than or equal to 2. In this case, the electronic device 1 according to the embodiment may include the same number of LNAs 52, the same number of mixers 54, the same number of IF units 56, and the same number of AD converters 58 as the plurality of reception antennas 50.

Transmission waves transmitted and reception waves received in the operation of the electronic device 1 according to the embodiment will be described below.

When measuring distance or the like by millimeter-wave radar, frequency-modulated continuous wave radar (hereafter, "FMCW radar") is often used. FMCW radar sweeps the frequency of transmitted radio waves to generate a transmission signal. Therefore, for example, in millimeter-wave FMCW radar using radio waves in a frequency band of 79 GHz, the radio waves used have a frequency bandwidth of 4 GHz, e.g. 77 GHz to 81 GHz. Radar of 79 GHz in frequency band has a feature that its usable frequency bandwidth is broader than that of millimeter wave/submillimeter wave radar of 24 GHz, 60 GHz, 76 GHz, etc. in frequency band.

The transmission signal generated by the electronic device 1 according to the embodiment may be a chirp signal. The chirp signal is a signal whose frequency changes continuously with time. The chirp signal is also referred to as "frequency-modulated continuous wave (FMCW)". The change in frequency of the chirp signal may be increasing or decreasing, or a combination of increasing and decreasing. The chirp signal may include a linear chirp signal whose frequency changes linearly with time, an exponential chirp signal whose frequency changes exponentially with time, or the like. In the case where the transmission signal is a chirp signal, as information for generating a chirp signal in each operation mode, parameters such as start frequency, end frequency, and duration may be stored in the memory 12 as information relating to the operation mode.

The signal generated by the signal generator 22 is not limited to a FMCW signal. The signal generated by the signal generator 22 may be a signal of any of various systems such as a pulse system, a pulse compression system (spread spectrum system), and a frequency continuous wave (CW) system. When measuring distance or the like by millimeter wave radar, frequency-modulated continuous wave radar (hereafter, "FMCW radar") is often used. FMCW radar sweeps the frequency of transmitted radio waves to generate a transmission signal. Therefore, for example, in millimeter-wave FMCW radar using radio waves in a frequency band of 79 GHz, the radio waves used have a frequency bandwidth of 4 GHz, e.g. 77 GHz to 81

GHz. Radar of 79 GHz in frequency band has a feature that its usable frequency bandwidth is broader than that of other millimeter wave/submillimeter wave radar of 24 GHz, 60 GHz, 76 GHz, etc. in frequency band. This embodiment will be described below.

The FMCW radar system used in the present disclosure may include a fast-chirp modulation (FCM) system that transmits a chirp signal in a cycle shorter than normal. The signal generated by the signal generator 22 is not limited to a FM-CW signal. The signal generated by the signal generator 22 may be a signal of any of various systems other than FM-CW. A transmission signal sequence stored in the memory 12 may be different depending on the system used. For example, in the case of a FM-CW radar signal, a signal whose frequency increases and a signal whose frequency decreases for each time sample may be used. Well-known techniques can be appropriately applied to the foregoing various systems, and therefore more detailed description is omitted.

As described above, as a result of forming a beam of radio waves transmitted from a plurality of transmission antennas 40 (i.e. beamforming), transmission waves in a predetermined direction can intensify each other. In this way, the electronic device 1 can improve the accuracy in measuring the distance between the mobile body 100 having the electronic device 1 mounted therein and the object 200, the direction to the object 200, and the like. Hence, the electronic device 1 according to the embodiment uses, as transmission waves, radio waves that change in frequency with time as in FMCW radar, and performs beamforming for such transmission waves when necessary. This embodiment will be described in more detail below.

A state in which the electronic device 1 according to the embodiment receives the reflected waves R by the plurality of reception antennas 50 will be described below.

Figure 3:
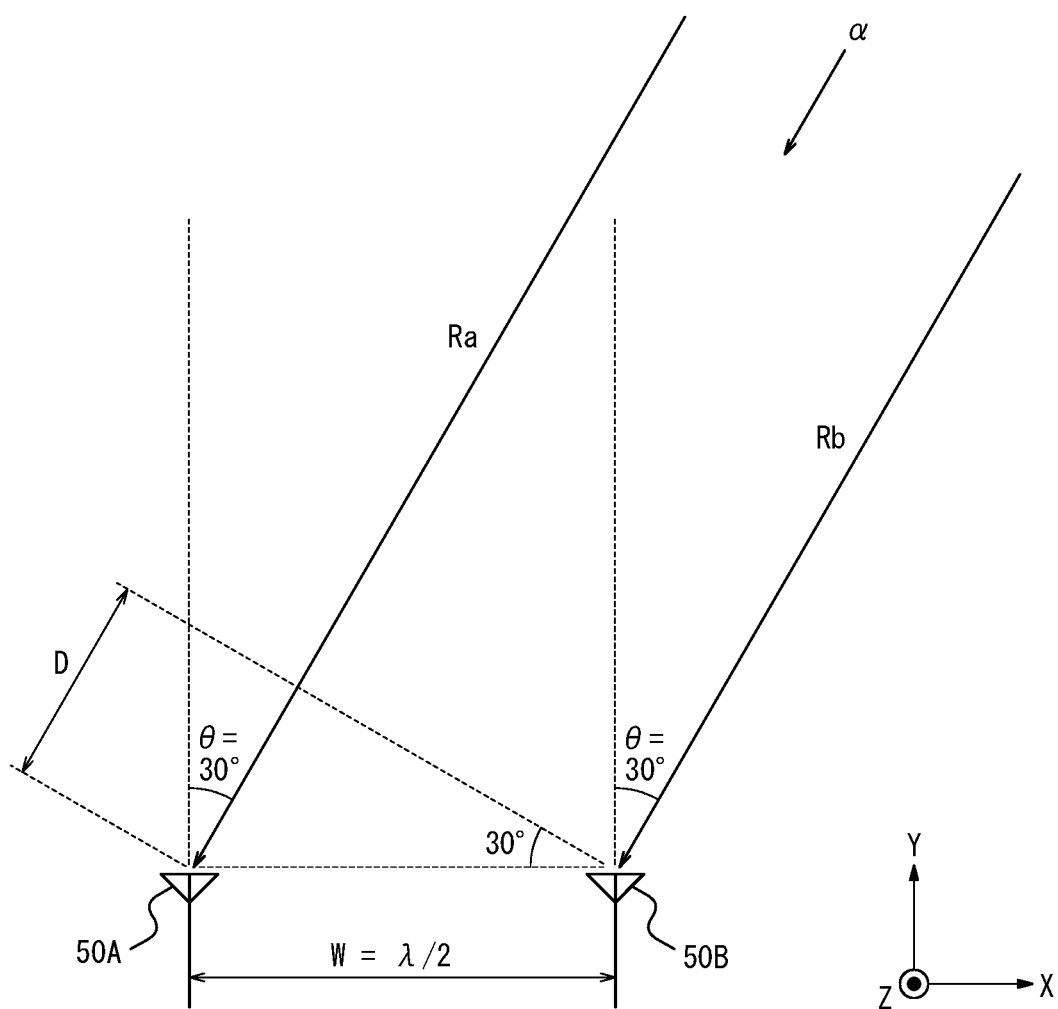
FIG. 3 is a diagram illustrating an example of reflected waves received by the electronic device according to the embodiment.

FIG. 3 is a diagram illustrating an example of the reception waves received by the electronic device 1. An example in which two reception antennas 50A and 50B are arranged as the plurality of reception antennas 50 will be described below, as illustrated in FIG. 3. In an embodiment, however, any number of two or more reception antennas 50 may be arranged.

The electronic device 1 according to the embodiment includes the plurality of reception antennas 50 as illustrated in FIG. 3, and thus can estimate (measure) the direction of an object. Specifically, the electronic device 1 according to the embodiment receives the reflected waves R generated as a result of the transmission waves T transmitted from the transmission antennas 40 being reflected off the object, by the plurality of reception antennas 50. The electronic device 1 according to the embodiment estimates the direction of the object reflecting the transmission waves T, based on the path difference D between the plurality of reflected waves R received by the plurality of reception antennas 50.

In an embodiment, the direction (Y-axis direction) perpendicular to the direction (X-axis direction) in which the plurality of reception antennas 50 are arranged is a reference direction, as illustrated in FIG. 3. In an embodiment, the angle between a straight line parallel to the reference direction (Y-axis direction) and a straight line corresponding to the direction in which the reflected waves R are incident on the reception antennas 50 is an incidence angle θ, as illustrated in FIG. 3.

In the electronic device 1, the reception antennas 50A and 50B are arranged with a spacing W, as illustrated in FIG. 3. The following will describe the case where radio waves (reflected waves R) in a direction α (incidence angle of 30°) illustrated in FIG. 3 are received by the plurality of reception antennas 50 arranged in this manner. That is, the following will describe the case where the reflected waves R in the direction α that is inclined 30° to the right with respect to the Y-axis positive direction are received by the reception antennas 50A and 50B.

The spacing W between the reception antennas 50A and 50B illustrated in FIG. 3 is λ/2, where λ is the wavelength of the transmission waves. Consider the case where reflected waves R of radio waves transmitted at 79 GHz which is the center frequency of the frequency band of 77 GHz to 81 GHz are received by the plurality of reception antennas 50. In this case, the wavelength λ ($=c/f=3.0\times10^8$ [m/s]/$79\times10^9$) of the reflected waves is 3.7975 [mm], where the light speed is $c=3.0\times10^8$ [m/s]. Hence, the spacing W=λ/2 between the reception antennas 50A and 50B is 1.8987 [mm].

There is a path difference between the reflected waves R received in the direction α by the two reception antennas 50 arranged with the spacing W=1.8987 [mm]. As illustrated in FIG. 3, the reception waves received by the reception antenna 50A in the direction α are referred to as reflected waves Ra, and the reception waves received by the reception antenna 50B in the direction α are referred to as reflected waves Rb. Herein, in the case where the reflected waves Ra and the reflected waves Rb are not distinguished from each other, they are collectively referred to as "reflected waves R". In the example illustrated in FIG. 3, the path of the reflected waves Ra is longer than the path of the reflected waves Rb by the path difference D.

As illustrated in FIG. 3, the path difference D between the reflected waves Ra and the reflected waves Rb received in the direction α can be expressed as W·sin 30°, using the spacing W between the reception antennas 50. Accordingly, the path difference D=W/2 is 0.9494 [mm]. Using the wavelength λ, the path difference D=W/2 can be expressed as D=λ/4, because W=λ/2. This expression reveals that the path difference D corresponds to a phase of ¼ of the wavelength λ, i.e. a phase of 90° (π/2). Therefore, in the case where the frequency of the transmission waves T is 79 GHz, the phase difference between the reflected waves Ra (incidence angle of) 30° received by the reception antenna 50A and the reflected waves Rb (incidence angle of 30°) received by the reception antenna 50B is 90° (π/2). Moreover, the phase of the reflected waves Ra (incidence angle of 30°) received by the reception antenna 50A is delayed by 90° (π/2) with respect to the phase of the reflected waves Rb received by the reception antenna 50B, as illustrated in FIG. 3. It can be presumed from FIG. 3 that, in the case where the phase of the reflected waves Ra is delayed by 90° (π/2) with respect to the phase of the reflected waves Rb, the direction of the object reflecting the transmission waves T is inclined at an angle of 30° to the right (clockwise) from the reference direction.

Next, consider the case where the incidence angle θ of the reflected waves R is larger. FIG. 4 is a diagram illustrating another example of the reception waves received by the electronic device 1.

The following will describe the case where radio waves (reflected waves R) in a direction α' (incidence angle of 90°) are received as illustrated in FIG. 4. That is, the following will describe the case where the reflected waves R in the direction α' that is inclined 90° to the right with respect to the Y-axis positive direction, i.e. in an approximately directly horizontal direction, are received by the reception antennas 50A and 50B.

The spacing W between the reception antennas 50A and 50B illustrated in FIG. 4 is 1.8987 [mm], as in FIG. 3.

Consider the case where reflected waves R of radio waves transmitted at 79 GHz are received by the plurality of reception antennas 50, as in the foregoing situation.

In the situation illustrated in FIG. 4, too, there is a path difference between the reflected waves R received in the direction α' by the two reception antennas 50 arranged with the spacing W, as in the situation illustrated in FIG. 3. In FIG. 4, too, the reception waves received by the reception antenna 50A in the direction α' are referred to as reflected waves Ra, and the reception waves received by the reception antenna 50B in the direction α' are referred to as reflected waves Rb. In the example illustrated in FIG. 4, too, the path of the reflected waves Ra is longer than the path of the reflected waves Rb by the path difference D.

As illustrated in FIG. 4, the path difference D between the reflected waves Ra and the reflected waves Rb received in the direction α' can be expressed as W·sin 90°, using the spacing W between the reception antennas 50. Accordingly, the path difference D=W is 1.8988 [mm]. Using the wavelength $\lambda$, the path difference D (=W) can be expressed as D=$\lambda$/2, because W=$\lambda$/2. This expression reveals that the path difference D corresponds to a phase of ½ of the wavelength $\lambda$, i.e. a phase of 180° ($\pi$). Therefore, in the case where the frequency of the transmission waves T is 79 GHz, the phase difference between the reflected waves Ra (incidence angle of) 90° received by the reception antenna 50A and the reflected waves Rb (incidence angle of 90°) received by the reception antenna 50B is 180° ($\pi$). Moreover, the phase of the reflected waves Ra (incidence angle of 90°) received by the reception antenna 50A is delayed by 180° ($\pi$) with respect to the phase of the reflected waves Rb received by the reception antenna 50B, as illustrated in FIG. 4. It can be presumed from FIG. 4 that, in the case where the phase of the reflected waves Ra is delayed by 180° ($\pi$) with respect to the phase of the reflected waves Rb, the direction of the object reflecting the transmission waves T is inclined at an angle of 90° to the right (clockwise) from the reference direction. Thus, the direction of the object reflecting the transmission waves T can be estimated based on the phase difference between the reflected waves Ra and the reflected waves Rb.

Next, consider the case where the frequency of the transmission waves T is higher in the situation illustrated in each of FIGS. 3 and 4.

Consider the case where, in the situation illustrated in FIG. 3, reflected waves R of radio waves transmitted at 81 GHz which is the maximum frequency of the frequency band of 77 GHz to 81 GHz are received by the plurality of reception antennas 50. In this case, the wavelength $\lambda$ (=c/f=$3.0 \times 10^8$ [m/s]/$81 \times 10^9$) of the reflected waves is 3.7037 [mm]. The spacing between the reception antennas 50A and 50B is W=1.8987 [mm], as in the foregoing situation. In this case, the path difference D in FIG. 3 is 1.8987×sin(30°). Hence, the phase difference between the reflected waves Ra received by the reception antenna 50A and the reflected waves Rb received by the reception antenna 50B is (1.8987 [mm]/3.7037 [mm])×360°×sin(30°)=92.28°. That is, in the case where the frequency of the transmission waves T is 81 GHz, the phase of the reflected waves Ra (incidence angle of 30°) received by the reception antenna 50A is delayed by 92.28° with respect to the phase of the reflected waves Rb (incidence angle of 30°) received by the reception antenna 50B. Thus, when the frequency of the transmission waves T is higher, the phase difference between the plurality of reflected waves R is greater.

Consider the case where, in the situation illustrated in FIG. 4, reflected waves R of radio waves transmitted at 81 GHz which is the maximum frequency of the frequency band of 77 GHz to 81 GHz are received by the plurality of reception antennas 50. In this case, the wavelength $\lambda$ (=c/f=$3.0 \times 10^8$ [m/s]/$81 \times 10^9$) of the reflected waves is 3.7037 [mm]. The spacing between the reception antennas 50A and 50B is W=1.8987 [mm], as in the foregoing situation. In this case, the path difference D (=W) in FIG. 4 is 1.8987×sin (90°). Hence, the phase difference between the reflected waves Ra received by the reception antenna 50A and the reflected waves Rb received by the reception antenna 50B is (1.8987 [mm]/3.7037 [mm])×360°×sin(90°=184.55°). That is, in the case where the frequency of the transmission waves T is 81 GHz, the phase of the reflected waves Ra (incidence angle of 90°) received by the reception antenna 50A is delayed by 184.55° with respect to the phase of the reflected waves Rb (incidence angle of 90°) received by the reception antenna 50B. Thus, when the frequency of the transmission waves T is higher in such a situation in which the incidence angle $\theta$ is larger, the phase difference between the reflected waves Ra received by the plurality of reception antennas 50 can exceed 180°.

In the case where the phase difference between the reflected waves Ra received by the plurality of reception antennas 50 exceeds 180°, however, a problem may arise in the detection of the object reflecting the transmission waves T. For example, in the case where the phase of the reflected waves Ra is delayed by 184.55° with respect to the phase of the reflected waves Rb, this state cannot be distinguished from the case where the phase of the reflected waves Ra is advanced by 175.45° (=360°-184.55°) with respect to the phase of the reflected waves Rb. For example, in the case of defining the phase difference to be −180° to +180° as in a normal process performed when detecting an object by radar, the foregoing phase difference is determined to be not a delay of 184.55° but an advance of 175.45°. In this case, even when the reception antennas 50 receive the reflected waves R at around an incidence angle $\theta$=90° (i.e. from the right side of the reception antenna 50B) as illustrated in FIG. 4, it is determined that the reception antennas 50 receive the reflected waves R at around an incidence angle $\theta$=−90° (i.e. from the left side of the reception antenna 50A). There is thus the possibility that, if the phase difference between the reflected waves Ra received by the plurality of reception antennas 50 exceeds 180°, the object reflecting the transmission waves T is not detected accurately.

When the reception antennas 50 receive the reflected waves R at around an incidence angle $\theta$=30° as illustrated in FIG. 3, on the other hand, the phase difference (about 92.28°) between the reflected waves R received by the plurality of reception antennas 50 does not exceed 180°. Thus, the foregoing problem does not occur in a situation in which the incidence angle $\theta$ is not relatively large. The threshold of the incidence angle $\theta$ that is determined to be relatively large may be, for example, an angle at which the incidence direction is higher than when the incidence angle $\theta$ is around 90° in FIG. 4. For example, the threshold of the incidence angle $\theta$ may be 80° or more.

As described above, in a situation in which the incidence angle $\theta$ is large, if the frequency of the transmission waves T is high, the phase difference between the reflected waves Ra received by the plurality of reception antennas 50 may exceed 180° and cause the problem. In view of this, the electronic device 1 according to the embodiment controls the frequency of the transmission waves T to be not high, in a situation in which the incidence angle $\theta$ is large.

The example described above concerns the case where the reflected waves R of the radio waves transmitted at 79 GHz which is the center frequency of the frequency band of 77 GHz to 81 GHz are received by the plurality of reception antennas 50. For example, one conceivable method for avoiding the foregoing problem is to set the antenna spacing W (=λ/2) with respect to the wavelength of 81 GHz which is the upper limit of the frequency usable for the transmission of the transmission waves T.

However, in the case of using the entire frequency band usable for the transmission of the transmission waves T, the entire frequency band of 77 GHz to 81 GHz is used. In such a case, the average of the phase differences at the frequencies of 77 GHz to 81 GHz is the phase difference at 79 GHz which is the center frequency. Hence, the phase difference between the reflected waves R received by the plurality of reception antennas 50 is represented by the phase difference at 79 GHz which is the center frequency. In the above-described avoidance method, the antenna spacing W is based on the frequency of 81 GHz, whereas the phase difference between the reflected waves R is based on the frequency of 79 GHz. This causes incompatibility between the antenna spacing W and the phase difference between the reflected waves R, as a result of which the object detection property may degrade. In object detection, it is desirable to set the antenna spacing W (=λ/2) so as to maximize the property, using the entire frequency band usable for the transmission of the transmission waves T. Accordingly, the antenna spacing W is typically determined based on the wavelength of 79 GHz which is the center frequency of 77 GHz to 81 GHz.

Operation of the electronic device 1 according to each of some embodiments will be described below.

Figure 5:
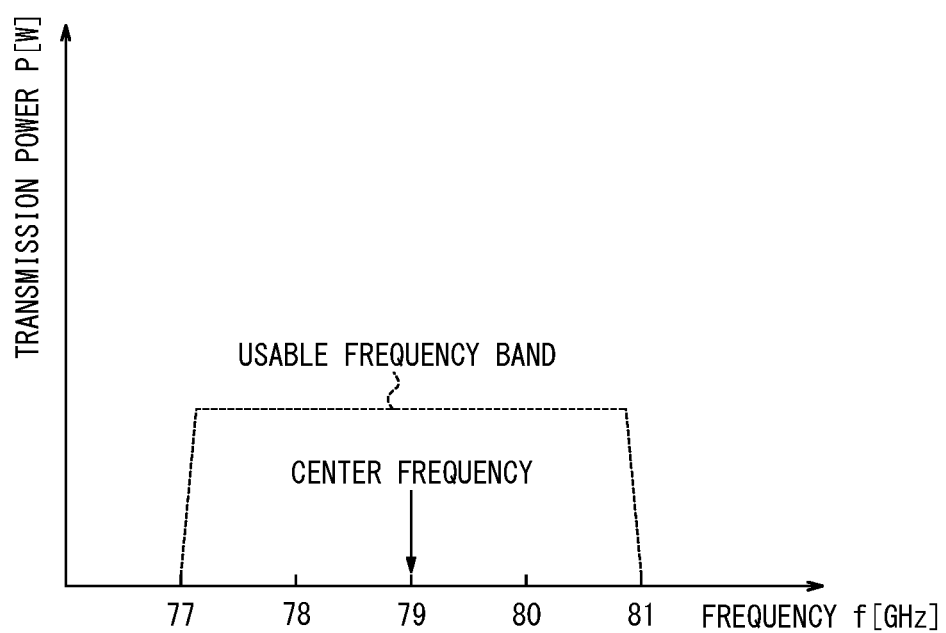
FIG. 5 is a diagram illustrating an example of a frequency band of transmission waves transmitted by the electronic device according to the embodiment.

FIG. 5 is a diagram illustrating an example of the frequency band of the transmission waves transmitted by the electronic device 1 according to each embodiment. In FIG. 5, the horizontal axis represents the frequency f [GHz], and the vertical axis represents the transmission power P [W] of the transmission waves T. It is assumed that the electronic device 1 according to each embodiment described below can use the frequency band of 77 GHz to 81 GHz for the transmission of the transmission waves T, as illustrated in FIG. 5. In detail, when transmitting the transmission waves T, the electronic device 1 according to each embodiment described below can assign the frequency band of 77 GHz to 81 GHz and transmit the transmission waves T from the transmission antennas 40. The center frequency in the frequency band of 77 GHz to 81 GHz usable for the transmission of the transmission waves T is 79 GHz, as illustrated in FIG. 5.

Embodiment 1

The electronic device 1 according to the embodiment controls the frequency of the transmission waves T to be not high in a situation in which the incidence angle θ is large, as mentioned above. In detail, in the case where the incidence angle θ when receiving the reflected waves R is less than a predetermined angle, the electronic device 1 according to Embodiment 1 transmits the transmission waves T using a frequency of a relatively high band part in the frequency band usable for the transmission of the transmission waves T. In the case where the incidence angle θ when receiving the reflected waves R is greater than or equal to the predetermined angle, the electronic device 1 according to Embodiment 1 transmits the transmission waves T using a frequency of a relatively low band part in the frequency band usable for the transmission of the transmission waves T. Herein, the "frequency of a relatively high band part" may be, for example, a frequency higher than the center frequency in the frequency band usable for the transmission of the transmission waves T. The "frequency of a relatively low band part" may be, for example, a frequency lower than the center frequency in the frequency band usable for the transmission of the transmission waves T. The operation of the electronic device 1 according to Embodiment 1 will be described in more detail below.

Figure 6:
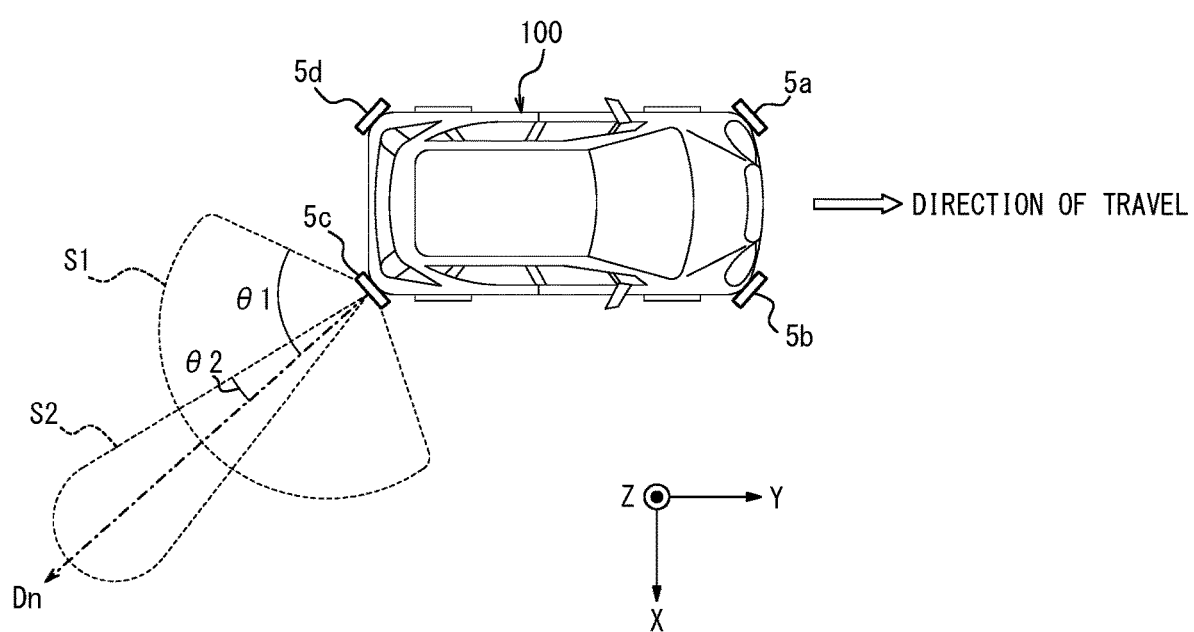
FIG. 6 is a diagram illustrating operation of an electronic device according to Embodiment 1.

FIG. 6 is a diagram illustrating an example in which the sensor according to Embodiment 1 is provided in the mobile body. In the case where the electronic device 1 includes a plurality of sensors 5, the sensor 5 may be installed in a plurality of parts of the mobile body 100, as illustrated in FIG. 6.

In the example illustrated in FIG. 6, a sensor 5a is located in a front left part of the mobile body 100, a sensor 5b is located in a front right part of the mobile body 100, a sensor 5c is located in a back right part of the mobile body 100, and a sensor 5d is located in a back left part of the mobile body 100. The sensor 5c can detect an object in a detection range S1 or S2, as illustrated in FIG. 6. The detection ranges S1 and S2 are schematically illustrated in FIG. 6.

In the case where the sensor 5c performs object detection in the detection range S1, the electronic device 1 may cause the transmission waves T transmitted by the transmission antennas 40 to be included in the detection range S1. In the case where the sensor 5c performs object detection in the detection range S1, the electronic device 1 may cause the incidence angle when the reception antennas 50 receive the reflected waves R to be included in the detection range S1. Likewise, in the case where the sensor 5c performs object detection in the detection range S2, the electronic device 1 may cause the transmission waves T transmitted by the transmission antennas 40 to be included in the detection range S2. In the case where the sensor 5c performs object detection in the detection range S2, the electronic device 1 may cause the incidence angle when the reception antennas 50 receive the reflected waves R to be included in the detection range S2.

The sensor 5a, 5b, and/or 5c may transmit the transmission waves T, too, although illustration is omitted for simplicity's sake. The following will describe only one sensor 5c. Hereafter, in the case where a plurality of sensors such as the sensors 5a, 5b, 5c, and 5d in the electronic device 1 according to Embodiment 1 are not distinguished from each other, they are collectively referred to as "sensor 5".

The electronic device 1 according to the embodiment is capable of controlling the plurality of sensors 5 individually. For example, the electronic device 1 may control the on/off state of each of the plurality of sensors 5 independently. For example, the electronic device 1 may control at least one of the beam width and the reaching distance of the transmission waves transmitted from each of the plurality of sensors 5 independently. For example, the electronic device 1 may control the operation mode (e.g. normal mode/BF mode) of each of the plurality of sensors 5 independently. For example, the electronic device 1 may control the beamforming direction of the transmission waves transmitted from each of the plurality of sensors 5 independently. By appropriately controlling, for example, the beam width and/or the reaching distance of the transmission waves transmitted from each of the plurality of sensors 5, the electronic device 1 according to the embodiment can perform object detection substantially all around the mobile body 10 in FIG. 6.

The direction perpendicular to the direction in which the plurality of reception antennas 50 are arranged in the sensor 5c is a reference direction Dn, as illustrated in FIG. 6. The reference direction Dn in FIG. 6 may correspond to the reference direction (the Y-axis direction) in FIG. 3.

For example, in the case of the detection range S1 in which the incidence angle θ1 when the reception antennas 50 receive the reflected waves R is relatively large, the electronic device 1 according to Embodiment 1 selects the frequency used to transmit the transmission waves T from a relatively low band part in the usable frequency band. Herein, the case where the incidence angle θ1 is relatively large may be the case where the incidence angle θ1 is greater than or equal to the predetermined angle. The predetermined angle may be set as appropriate based on the threshold beyond which the phase advance and delay described with reference to FIGS. 3 and 4 are indistinguishable. For example, the predetermined angle is 80°.

Figure 7:
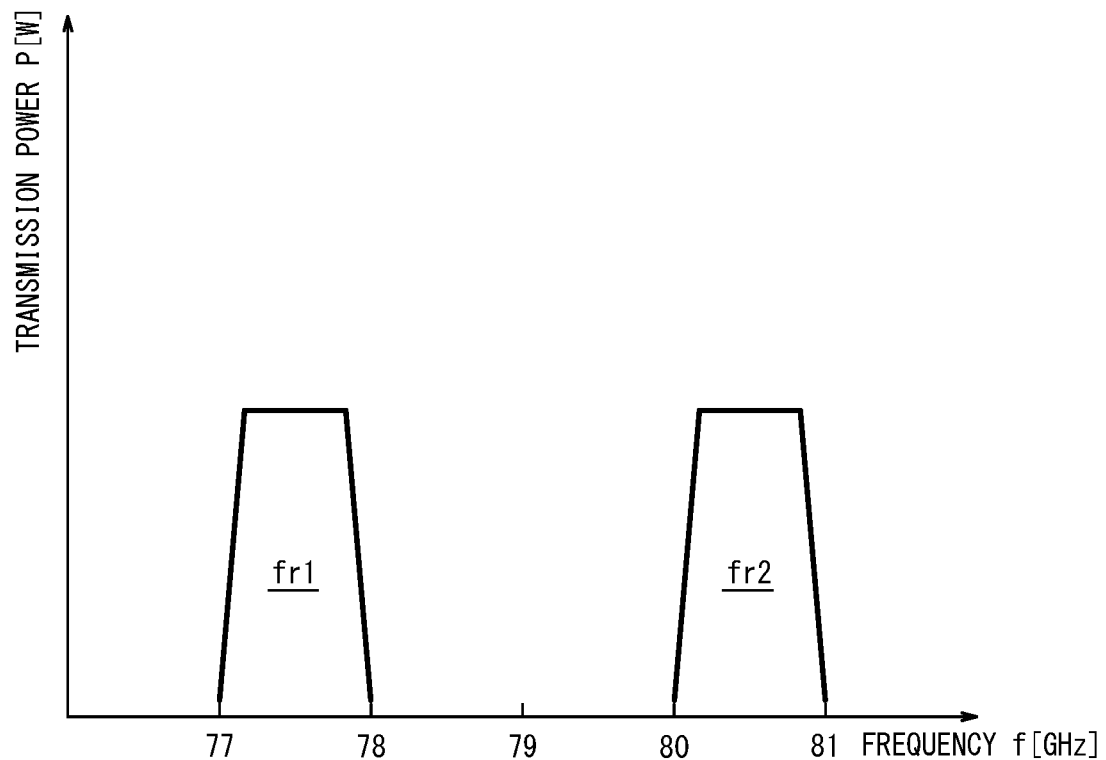
FIG. 7 is a diagram illustrating operation of the electronic device according to Embodiment 1.

In such a case, for example, the electronic device 1 may transmit the transmission waves T using a frequency of a relatively low band part fr1 in the frequency band of 77 GHz to 81 GHz usable for the transmission of the transmission waves T, as illustrated in FIG. 7. FIG. 7 is a diagram illustrating an example of the frequency band of the transmission waves transmitted by the electronic device 1 according to Embodiment 1. In FIG. 7, the horizontal axis represents the frequency f [GHz], and the vertical axis represents the transmission power P [W] of the transmission waves T, as in FIG. 6. The relatively low band part may be, for example, a band part lower than the center frequency of 79 GHz in the frequency band of 77 GHz to 81 GHz usable for the transmission of the transmission waves T, such as the band part fr1 (77 GHz to 78 GHz) in FIG. 7. The relatively low band part may be, for example, a band part whose center frequency is lower than the center frequency of 79 GHz. In other words, the center frequency of the band part fr1 may be lower than the center frequency of 79 GHz in the frequency band (77 GHz to 81 GHz) usable for the transmission of the transmission waves T.

For example, in the case of the detection range S2 in which the incidence angle θ2 when the reception antennas 50 receive the reflected waves R is relatively small, the electronic device 1 according to Embodiment 1 selects the frequency used to transmit the transmission waves T from a relatively high band part in the usable frequency band. Herein, the case where the incidence angle θ2 is relatively small may be the case where the incidence angle θ2 is less than the predetermined angle. The predetermined angle may be set as appropriate based on the threshold beyond which the phase advance and delay described with reference to FIGS. 3 and 4 are indistinguishable, as in the foregoing case. For example, the predetermined angle is 80°.

In such a case, for example, the electronic device 1 may transmit the transmission waves T using a frequency of a relatively high band part fr2 in the frequency band of 77 GHz to 81 GHz usable for the transmission of the transmission waves T, as illustrated in FIG. 7. The relatively high band part may be, for example, a band part higher than the center frequency of 79 GHz in the frequency band of 77 GHz to 81 GHz usable for the transmission of the transmission waves T, such as the band part fr2 (80 GHz to 81 GHz) in FIG. 7. The relatively high band part may be, for example, a band part whose center frequency is higher than the center frequency of 79 GHz. In other words, the center frequency of the band part fr2 may be higher than the center frequency of 79 GHz in the frequency band (77 GHz to 81 GHz) usable for the transmission of the transmission waves T.

The relatively high band part may be a band part higher in frequency than the band part fr1. In this case, the band part fr2 in FIG. 7 may not overlap in frequency with the band part fr1. The relatively high band part may be, for example, a band part whose center frequency is higher than the center frequency of the band part fr1. In other words, the center frequency of the band part fr2 may be higher than the center frequency of the band part fr1. In this case, the band part fr2 and the band part fr1 may partially overlap with each other.

In the case where the incidence angle θ is greater than or equal to the predetermined angle, the electronic device 1 according to Embodiment 1 controls the frequency of the transmission waves T to be not high. The electronic device 1 according to Embodiment 1 thus prevents the frequency of the transmission waves T from being high in a situation in which the incidence angle θ is large. Therefore, the electronic device 1 according to Embodiment 1 can avoid the problem in that the phase advance and delay are indistinguishable, and improve the object detection accuracy.

In the example illustrated in FIG. 6, the direction of the axis of symmetry of the detection range S2 is the same as the reference direction Dn. Alternatively, the direction of the axis of symmetry of the detection range S2 may be different from the reference direction Dn. For example, by controlling the phase of the transmission waves transmitted from at least one of the plurality of transmission antennas 40, the direction of the beam can be changed. Accordingly, the direction of the detection range S2 can be changed with respect to the sensor 5c as the center. In Embodiment 1, the direction of the detection range S2 may be any direction as long as the incidence angle θ when the reception antennas 50 receive the reflected waves R is less than the predetermined angle. In the example illustrated in FIG. 6, the direction of the axis of symmetry of the detection range S1 may be different from the reference direction Dn, too.

Figure 8:
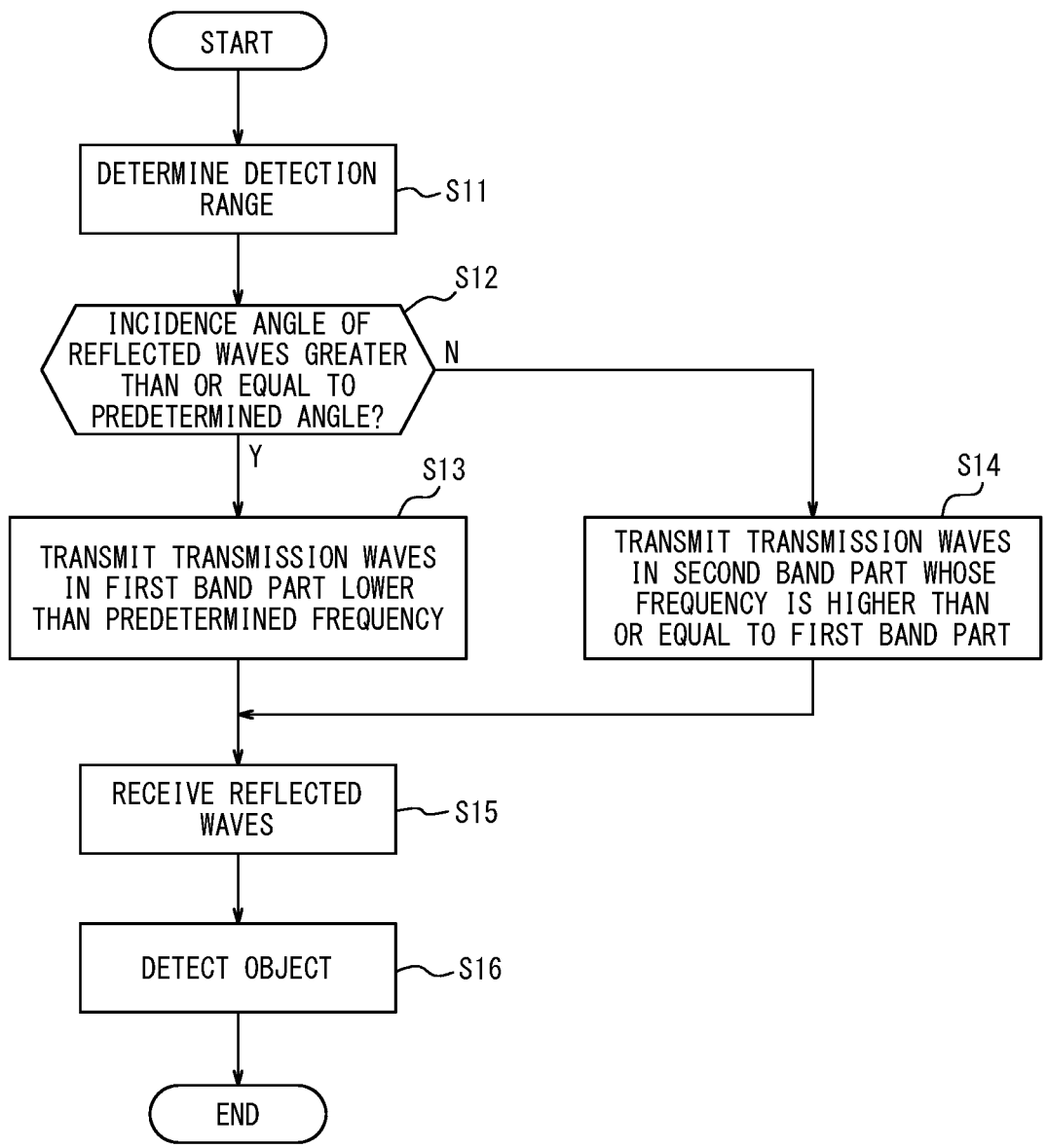
FIG. 8 is a flowchart illustrating operation of the electronic device according to Embodiment 1.

FIG. 8 is a flowchart illustrating the operation of the electronic device 1 according to Embodiment 1. The operation illustrated in FIG. 8 may be started, for example, when the electronic device 1 starts the detection of the object 200 around the mobile body 100. That is, the operation illustrated in FIG. 8 may be started when performing object detection using the sensor 5 in the electronic device 1.

After the start of the operation illustrated in FIG. 8, the detection range determination unit 14 in the controller 10 determines the range of object detection by the transmission waves T and the reflected waves R (step S11). In step S11, the detection range determination unit 14 may determine, for example, whether the detection range by the sensor 5c in FIG. 6 is to be the detection range S1 or the detection range S2.

In step S11, for example, the detection range determination unit 14 may determine a default range as the detection range. In step S11, for example, the detection range determination unit 14 may determine the detection range based on the position of an object detected using the transmission waves T of a previous frame. In this case, the detection range determination unit 14 may determine the detection range based on an object detection result by at least one of the distance estimation unit 62, the angle estimation unit 64, and the relative speed estimation unit 66.

After the detection range is determined in step S11, the controller 10 determines whether the incidence angle θ of the reflected waves R is greater than or equal to a predetermined angle (step S12). In step S12, the predetermined angle may be set as appropriate based on the threshold beyond which the phase advance and delay described with reference to FIGS. 3 and 4 are indistinguishable. For example, the predetermined angle is 80°. That is, in step S12, the predetermined angle may be set so that, if the incidence angle θ of the reflected waves R is greater than or equal to the predetermined angle, the phase advance and delay described with reference to FIGS. 3 and 4 are indistinguishable.

In the case where the controller 10 determines that the incidence angle θ of the reflected waves R is greater than or equal to the predetermined angle in step S12, the frequency selector 16 selects a frequency of a first band part lower than a predetermined frequency in a predetermined frequency band (step 13). The predetermined frequency band may be the frequency band (e.g. 77 GHz to 81 GHz) usable for detection, as mentioned above. The first band part lower than the predetermined frequency may be, for example, the band part fr1 in FIG. 7. The predetermined frequency may be, for example, the center frequency (79 GHz) illustrated in FIG. 5. In step 13, the controller 10 transmits the transmission waves T from the transmission antennas 40 using the selected frequency.

In the case where the controller 10 determines that the incidence angle θ of the reflected waves R is less than the predetermined angle in step S12, the frequency selector 16 selects a frequency of a second band part higher than the predetermined frequency in the predetermined frequency band (step 14). The predetermined frequency band may be the frequency band (e.g. 77 GHz to 81 GHz) usable for detection, as mentioned above. The second band part higher than the predetermined frequency may be, for example, the band part fr2 in FIG. 7. The predetermined frequency may be, for example, the center frequency (79 GHz) illustrated in FIG. 5. In step 14, the controller 10 transmits the transmission waves T from the transmission antennas 40 using the selected frequency.

After the transmission waves T are transmitted in step S13 or S14, the electronic device 1 receives the reflected waves R by the plurality of reception antennas 50 (step S15). After the reflected waves R are received in step S15, the electronic device 1 detects an object, such as the object 200, around the electronic device 1 (or the mobile body 100) (step S16). In step S16, the controller 10 may detect an object based on an estimation result of at least one of the distance estimation unit 62, the angle estimation unit 64, and the relative speed estimation unit 66.

Since the object detection in step S16 can be performed using a known millimeter wave radar technique according to any of various algorithms, more detailed description is omitted. After step S16 in FIG. 8, the controller 10 may perform step S11 again.

Thus, in Embodiment 1, the controller 10 detects the object reflecting the transmission waves T based on the transmission signal transmitted as the transmission waves T and the reception signal received as the reflected waves R. The controller 10 also determines the band part used to transmit the transmission waves T in the predetermined frequency band (e.g. the frequency band usable for detection), depending on the incidence angle θ when the reception antennas 50 receive the reflected waves R. Herein, the incidence angle θ may be the angle between a straight line corresponding to the direction in which the reflected waves R are incident on the reception antennas 50 and a perpendicular line to the direction in which the plurality of reception antennas 50 are arranged.

In Embodiment 1, in the case where the incidence angle θ is greater than or equal to the predetermined angle, the controller 10 may set the frequency of the band part used to transmit the transmission waves T to be lower than or equal to the predetermined frequency in the predetermined frequency band. In Embodiment 1, in the case where the incidence angle θ is greater than or equal to the predetermined first angle, the controller 10 may set the frequency of the band part used to transmit the transmission waves T to be lower than the center frequency of the predetermined frequency band.

In Embodiment 1, in the case where the incidence angle θ is greater than or equal to the first angle, the controller 10 may set the center frequency of the band part used to transmit the transmission waves T to be lower than the center frequency of the predetermined frequency band. In Embodiment 1, in the case where the incidence angle θ is less than the first angle, the controller 10 may set the center frequency of the band part used to transmit the transmission waves T to be greater than or equal to the center frequency of the predetermined frequency band.

The electronic device 1 according to Embodiment 1 controls the frequency of the transmission waves T to be low in a situation in which the incidence angle θ is large. Thus, the electronic device 1 according to Embodiment 1 can prevent the problem in that the phase advance and delay are indistinguishable, and accurately detect the object reflecting the transmission waves T.

Embodiment 2

The electronic device 1 according to Embodiment 2 will be described below.

In Embodiment 1 described above, two band parts for transmitting the transmission waves T are set in the usable frequency band depending on the incidence angle θ when the reception antennas 50 receive the reflected waves R (see FIGS. 6 and 7).

Figure 9:
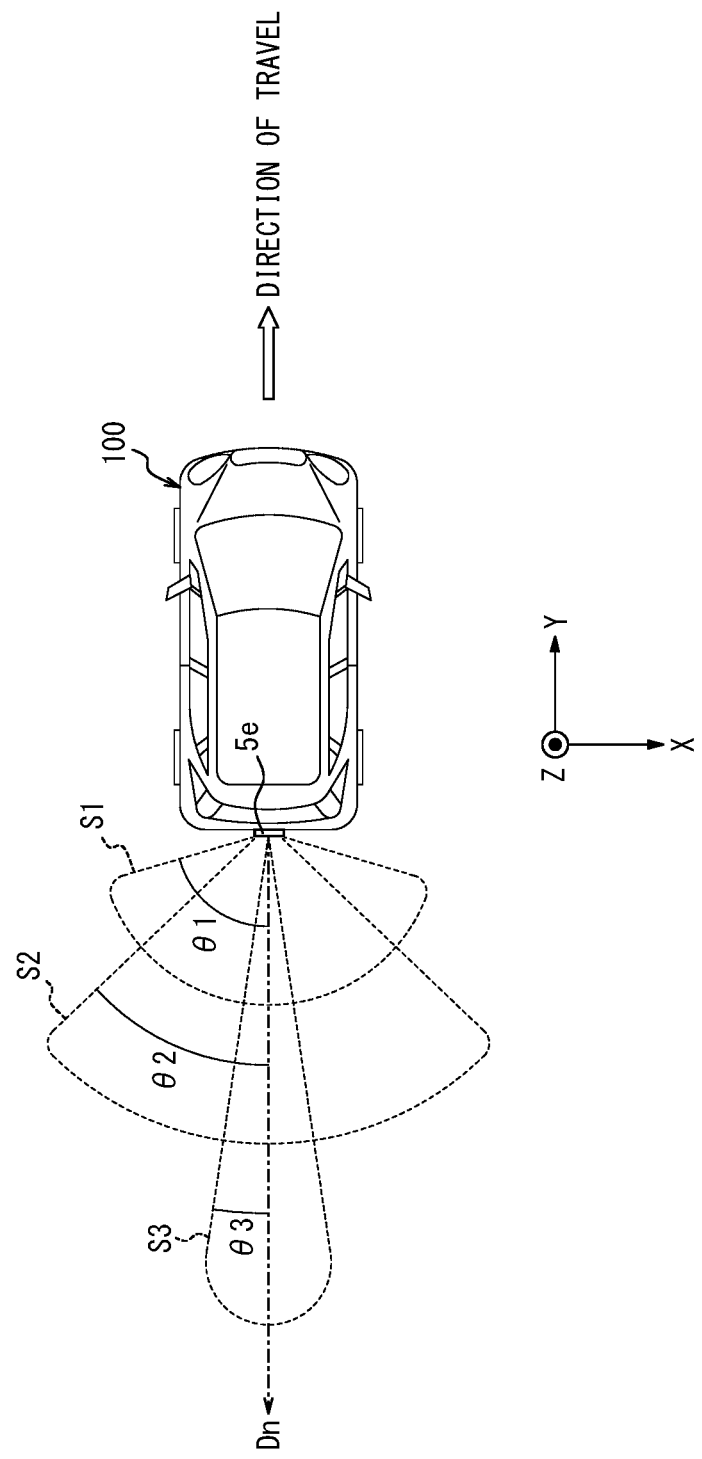
FIG. 9 is a diagram illustrating operation of an electronic device according to Embodiment 2.
Figure 10:
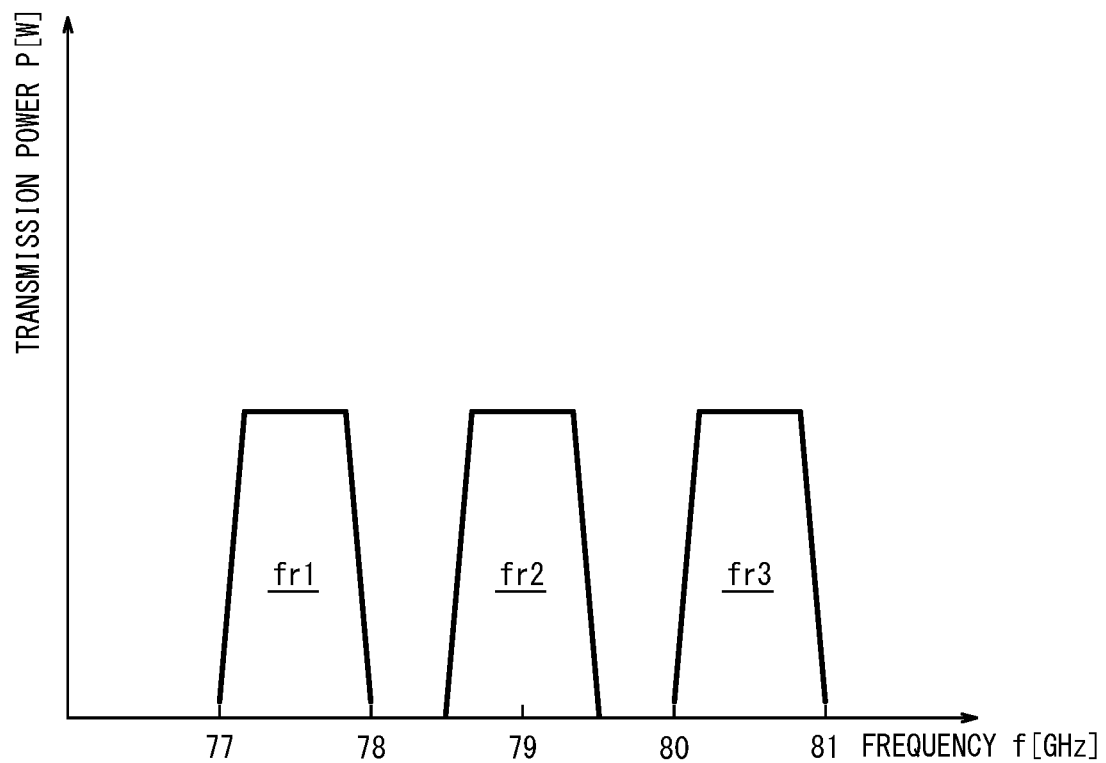
FIG. 10 is a diagram illustrating operation of the electronic device according to Embodiment 2.

The electronic device 1 according to Embodiment 2 sets three band parts for transmitting the transmission waves T in the usable frequency band depending on the incidence angle θ when the reception antennas 50 receive the reflected waves R, as illustrated in FIGS. 9 and 10. The description of the parts same as or similar to those in Embodiment 1 will be simplified or omitted as appropriate.

FIG. 9 is a diagram illustrating an example in which the sensor according to Embodiment 2 is provided in the mobile body. The following will describe only one sensor 5e in FIG. 9, while omitting the description of the other sensors 5 for simplicity's sake.

In the example illustrated in FIG. 9, the sensor 5e is located at the back center of the mobile body 100. The sensor 5e can detect an object in a detection range S1, S2, or S3, as illustrated in FIG. 9. The detection ranges S1, S2, and S3 are schematically illustrated in FIG. 9.

In the case where the sensor 5e performs object detection in the detection range S1, S2, or S3, the electronic device 1 may cause the transmission waves T transmitted by the transmission antennas 40 to be included in the detection range. In the case where the sensor 5e performs object detection in the detection range S1, S2, or S3, the electronic device 1 may cause the incidence angle when the reception antennas 50 receive the reflected waves R to be included in the detection range.

The direction perpendicular to the direction in which the plurality of reception antennas 50 are arranged in the sensor 5e is a reference direction Dn, as illustrated in FIG. 9. The reference direction Dn in FIG. 9 may correspond to the reference direction (the Y-axis direction) in FIG. 3.

For example, in the case of the detection range S1 in which the incidence angle θ1 when the reception antennas 50 receive the reflected waves R is relatively large, the electronic device 1 according to Embodiment 2 selects the frequency used to transmit the transmission waves T from a relatively low band part in the usable frequency band.

Herein, the case where the incidence angle θ1 is relatively large may be the case where the incidence angle θ1 is greater than or equal to a first angle. The first angle may be set as appropriate based on the threshold beyond which the phase advance and delay described with reference to FIGS. 3 and 4 are indistinguishable. For example, the first angle is 80°.

In such a case, for example, the electronic device 1 may transmit the transmission waves T using a frequency of a relatively low band part fr1 in the frequency band usable for the transmission of the transmission waves T, as illustrated in FIG. 10. FIG. 10 is a diagram illustrating an example of the frequency band of the transmission waves transmitted by the electronic device 1 according to Embodiment 2. The relatively low band part fr1 may be the same as that in Embodiment 1.

For example, in the case of the detection range S2 in which the incidence angle θ2 when the reception antennas 50 receive the reflected waves R is greater than or equal to a second angle that is less than the first angle, the electronic device 1 according to Embodiment 2 selects the frequency used to transmit the transmission waves T from a second band part whose frequency is higher than or equal to the first band part in the usable frequency band. The second angle may be any angle (e.g. 20°) less than the first angle.

In such a case, for example, the electronic device 1 may transmit the transmission waves T using a frequency of a second band part fr2 higher in frequency than the first band in the frequency band usable for the transmission of the transmission waves T, as illustrated in FIG. 10. The second band part may be, for example, a band part around the center frequency of 79 GHz in the frequency band usable for the transmission of the transmission waves T, such as the band part fr2 (78.5 GHz to 79.5 GHz) in FIG. 10. The second band part fr2 may be, for example, a band part whose center frequency is higher than the center frequency of the first band part. In other words, the center frequency of the band part fr2 may be higher than the center frequency of 77.5 GHz of the first band part.

For example, in the case of the detection range S3 in which the incidence angle θ3 when the reception antennas 50 receive the reflected waves R is less than the second angle, the electronic device 1 according to Embodiment 2 selects the frequency used to transmit the transmission waves T from a third band part whose frequency is higher than or equal to the second band part in the usable frequency band.

In such a case, for example, the electronic device 1 may transmit the transmission waves T using a frequency of a third band part fr3 higher in frequency than the second band in the frequency band usable for the transmission of the transmission waves T, as illustrated in FIG. 10. The third band part may be, for example, a band part around the maximum frequency of 81 GHz in the frequency band usable for the transmission of the transmission waves T, such as the band part fr3 (80 GHz to 81 GHz) in FIG. 10. The third band part fr3 may be, for example, a band part whose center frequency is higher than the center frequency of the first band part. The third band part fr3 may be, for example, a band part whose center frequency is higher than the center frequency of the second band part. In other words, the center frequency of the band part fr3 may be higher than the center frequency of the first band part and/or the center frequency of the second band part.

As illustrated in FIG. 10, the first band part fr1, the second band part fr2, and the third band part fr3 may not overlap with one another. Alternatively, the first band part fr1, the second band part fr2, and the third band part fr3 may partially overlap with one another.

In the case where the incidence angle θ is greater than or equal to the first angle, the electronic device 1 according to Embodiment 2 controls the frequency of the transmission waves T to be not high. The electronic device 1 according to Embodiment 2 thus prevents the frequency of the transmission waves T from being high in a situation in which the incidence angle θ is large. Therefore, the electronic device 1 according to Embodiment 2 can avoid the problem in that the phase advance and delay are indistinguishable, and improve the object detection accuracy.

Figure 11:
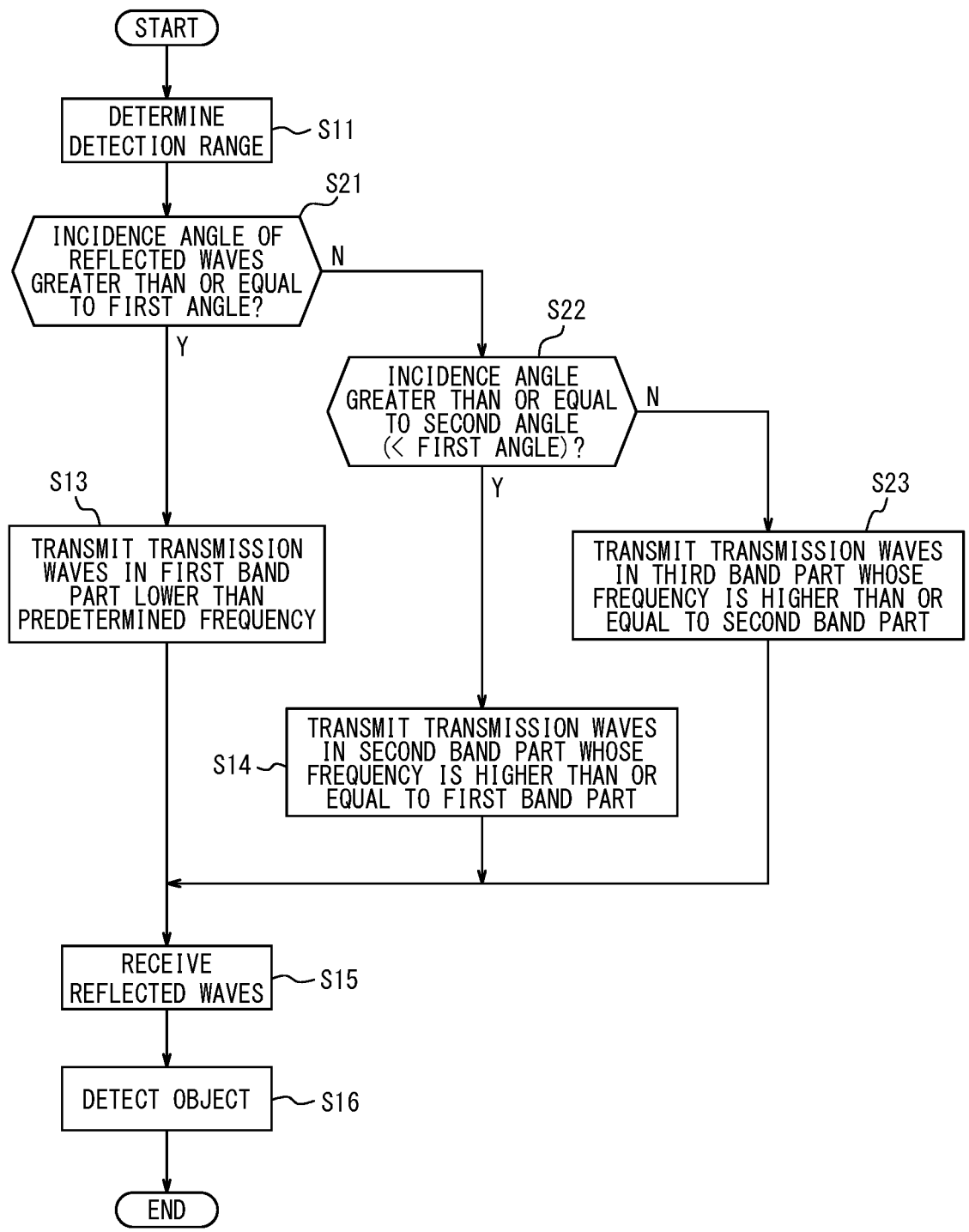
FIG. 11 is a flowchart illustrating operation of the electronic device according to Embodiment 2.

FIG. 11 is a flowchart illustrating the operation of the electronic device 1 according to Embodiment 2. The differences from the operation illustrated in FIG. 8 will be mainly described below, while simplifying or omitting the description of the parts same as or similar to those in the operation illustrated in FIG. 8.

After the operation illustrated in FIG. 11 starts and the detection range is determined in step S11, the controller 10 determines whether the incidence angle θ of the reflected waves R is greater than or equal to the first angle (step S21). The first angle may be the same as or different from the predetermined angle in step S12 in FIG. 8. The first angle may be set as appropriate based on the threshold beyond which the phase advance and delay described with reference to FIGS. 3 and 4 are indistinguishable. For example, the first angle is 80°.

In the case where the controller 10 determines that the incidence angle θ of the reflected waves R is greater than or equal to the predetermined angle in step S21, the same operation as in step S13 onward in FIG. 8 may be performed. In this case, for example, the frequency selector 16 may select a frequency (77 GHz to 78 GHz) in the band part fr1 illustrated in FIG. 10.

In the case where the controller 10 determines that the incidence angle θ of the reflected waves R is less than the predetermined angle in step S21, the controller 10 determines whether the incidence angle θ of the reflected waves R is greater than or equal to the second angle (step S22). The second angle may be an angle smaller than the first angle, e.g. 20°.

In the case where the controller 10 determines that the incidence angle θ of the reflected waves R is greater than or equal to the second angle in step S22, the same operation as in step S14 onward in FIG. 8 may be performed. In this case, for example, the frequency selector 16 may select a frequency (78.5 GHz to 79.5 GHz) in the band part fr2 illustrated in FIG. 10.

In the case where the controller 10 determines that the incidence angle θ of the reflected waves R is less than the second angle in step S22, the frequency selector 16 transmits the transmission waves T at a frequency in the third band part whose frequency is greater than or equal to the second band part (step S23). In this case, for example, the frequency selector 16 may select a frequency (80 GHz to 81 GHz) in the band part fr3 illustrated in FIG. 10.

After step S23, the same operation as in step S15 onward in FIG. 8 may be performed. After step S16 in FIG. 11, the controller 10 may perform step S11 again.

Thus, in Embodiment 2, in the case where the incidence angle θ is less than the second angle that is less than the first angle, the controller 10 may set, for example, the center frequency of the band part used to transmit the transmission waves T to be greater than or equal to a predetermined frequency higher than the center frequency of the predetermined frequency band.

The electronic device 1 according to Embodiment 2 controls the frequency of the transmission waves T to be low in a situation in which the incidence angle θ is large. Thus, the electronic device 2 according to Embodiment 1 can prevent the problem in that the phase advance and delay are indistinguishable, and accurately detect the object reflecting the transmission waves T. Moreover, the electronic device 1 according to Embodiment 2 can adaptively change the detection range depending on, for example, the detection purpose and/or detection target of the sensor 5, as illustrated in FIG. 9.

Embodiment 3

An electronic device 1 according to Embodiment 3 will be described below.

The electronic device 1 according to Embodiment 3 variably controls the predetermined angle with which the incidence angle θ of the reflected waves R is compared in the electronic device 1 according to Embodiment 1 described above. In Embodiment 1, the predetermined angle with which the incidence angle θ of the reflected waves R is compared is set as appropriate in step S12 in FIG. 8. In Embodiment 3, the predetermined angle with which the incidence angle θ of the reflected waves R is compared is set based on an object detection result.

Figure 12:
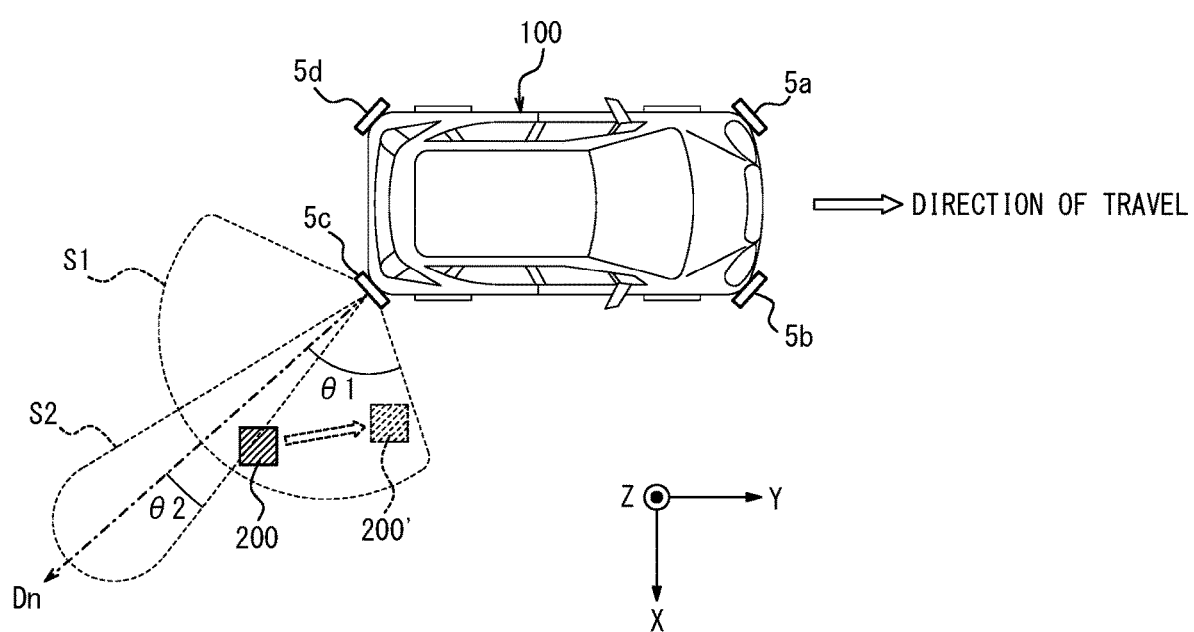
FIG. 12 is a diagram illustrating operation of an electronic device according to Embodiment 3.

FIG. 12 is a diagram illustrating an example in which a sensor according to Embodiment 3 is provided in the mobile body. The following will describe only one sensor 5c in FIG. 12, as in FIG. 6.

For example, in the case where an object 200 is present around the mobile body, the sensor 5c can detect the object in the detection range S2, as illustrated in FIG. 12. In this case, the incidence angle θ when the reception antennas 50 in the sensor 5c receive the reflected waves R is relatively small (i.e. not a large angle). Thus, in the case where the object is detected in the detection range S2, the situation in which the phase advance and delay are indistinguishable as described with reference to FIGS. 3 and 4 does not occur.

For example, suppose the object 200 in FIG. 12 has moved to the position of an object 200' in FIG. 12 with time. In this case, the sensor 5c can detect the object in the detection range S1. Then, the incidence angle θ when the reception antennas 50 in the sensor 5c receive the reflected waves R is relatively large. This can cause the situation in which the phase advance and delay are indistinguishable.

In view of this, in Embodiment 3, for example in the case where the incidence angle θ when the reception antennas 50 receive the reflected waves R is (or is likely to be) greater than or equal to a predetermined angle based on the position of the object that can move, the frequency of the band part used to transmit the transmission waves T may be set to be lower than or equal to a predetermined frequency. For example, if the frequency used to transmit the transmission waves T is a frequency in the band part fr1 in FIG. 7 when detecting the object 200' in FIG. 12, the situation in which the phase advance and delay are indistinguishable does not occur. If the frequency used to transmit the transmission waves T is a frequency in the band part fr2 in FIG. 7 when detecting the object 200' in FIG. 12, the situation in which the phase advance and delay are indistinguishable can occur. Hence, in Embodiment 3, in the case where the frequency used to transmit the transmission waves T is a frequency in the band part fr2 in FIG. 7 when detecting the object 200' in FIG. 12, the frequency is changed to a frequency in the band part fr1. Subsequently, the band part of the frequency used to transmit the transmission waves T may be changed as appropriate according to the movement of the object 200 (object 200').

FIG. 13 is a flowchart illustrating the operation of the electronic device 1 according to Embodiment 3. The differences of the operation of the electronic device 1 according to Embodiment 3 illustrated in FIG. 13 from the operation illustrated in FIG. 8 lie in step S12. The differences from the operation illustrated in FIG. 8 will be mainly described below, while simplifying or omitting the description of the parts same as or similar to those in the operation illustrated in FIG. 8.

After the operation illustrated in FIG. 13 starts and the detection range is determined in step S11, the controller 10 determines whether the position of an already detected object is greater than or equal to a predetermined angle (step S31). In step S31 immediately after the start of the operation illustrated in FIG. 13, there is a possibility that no object has been detected.

In such a case, the operation advances to step S14, where the frequency selector 16 may transmit the transmission waves T at a relatively high frequency such as a frequency in the band part fr2 illustrated in FIG. 7.

After step S14, the same operation as in step S15 onward in FIG. 8 may be performed. After step S16 in FIG. 13, the controller 10 may perform step S11 again.

After the detection range is determined in step S11 again, the controller 10 determines whether the position of the object detected in step S16 is greater than or equal to the predetermined angle (step S31). The predetermined angle may be set as appropriate based on the threshold beyond which the phase advance and delay described with reference to FIGS. 3 and 4 are indistinguishable, as in step S12 in FIG. 8. For example, the predetermined angle is 80°. In step S31, for example, whether the angle of the direction from the sensor 5c to the object 200 with respect to the reference direction Dn in FIG. 12 is greater than or equal to the predetermined angle may be determined.

In the case where the controller 10 determines that the position of the object is at an angle greater than or equal to the predetermined angle in step S31, the same operation as in step S13 onward in FIG. 8 may be performed. In this case, for example, the frequency selector 16 may select a frequency (77 GHz to 78 GHz) in the band part fr1 illustrated in FIG. 7.

In the case where the controller 10 determines that the position of the object is at an angle less than the predetermined angle in step S31, the same operation as in step S14 onward in FIG. 8 may be performed. In this case, for example, the frequency selector 16 may select a frequency (80 GHz to 81 GHz) in the band part fr2 illustrated in FIG. 7.

The electronic device 1 according to Embodiment 3 repeats the operation illustrated in FIG. 13. Hence, for example even when the object 200 is moving, the electronic device 1 can dynamically change the band part of the frequency used to transmit the transmission waves T according to the movement of the object 200.

Thus, in Embodiment 3, the controller 10 may determine the band part used to transmit the transmission waves T in the predetermined frequency band, based on the position of the detected object. In Embodiment 3, the controller 10 may dynamically vary the band part used to transmit the transmission waves T in the predetermined frequency band, according to the position of the detected object.

The electronic device 1 according to Embodiment 3 controls the frequency of the transmission waves T to be low as the angle of the position of the object increases, i.e. in a situation in which the incidence angle θ increases. Thus, the electronic device 1 according to Embodiment 3 can prevent the problem in that the phase advance and delay are indistinguishable, and accurately detect the object reflecting the transmission waves T. Moreover, the electronic device 1 according to Embodiment 3 can dynamically change the band part of the frequency used to transmit the transmission waves T according to the position of the moving object 200 (object 200'), as illustrated in FIG. 12.

While some embodiments and examples of the present disclosure have been described above by way of drawings, various changes and modifications may be easily made by those of ordinary skill in the art based on the present disclosure. Such changes and modifications are therefore included in the scope of the present disclosure. For example, the functions included in the functional parts, etc. may be rearranged without logical inconsistency, and a plurality of functional parts, etc. may be combined into one functional part, etc. and a functional part, etc. may be divided into a plurality of functional parts, etc. Moreover, each of the disclosed embodiments is not limited to the strict implementation of the embodiment, and features may be combined or partially omitted as appropriate. That is, various changes and modifications may be made to the presently disclosed techniques by those of ordinary skill in the art based on the present disclosure. Such changes and modifications are therefore included in the scope of the present disclosure. For example, functional parts, means, steps, etc. in each embodiment may be added to another embodiment without logical inconsistency, or replace functional parts, means, steps, etc. in another embodiment. In each embodiment, a plurality of functional parts, means, steps, etc. may be combined into one functional part, means, step, etc., and a functional part, means, step, etc. may be divided into a plurality of each functional parts, means, steps, etc. Moreover, each of the disclosed embodiments is not limited to the strict implementation of the embodiment, and features may be combined or partially omitted as appropriate.

As a modification to the foregoing embodiments, for example, the angle based on the threshold beyond which the phase advance and delay described with reference to FIGS. 3 and 4 are indistinguishable may be determined beforehand. In the case where the incidence angle θ is greater than or equal to the determined angle, the electronic device 1 may set the frequency of the band part used to transmit the transmission waves T to be a relatively low frequency such as a frequency in the band part fr1 illustrated in FIG. 7.

For example, in the example illustrated in FIG. 5, the usable frequency band is the frequency band of 77 GHz to 81 GHz, and the center frequency is f=79 [GHz]. When the center frequency of the usable frequency band is f [GHz], the spacing W between the reception antennas 50 is typically ½ of the wavelength λ of the frequency f. Accordingly, the spacing W can be expressed as W=λ/2. The light speed c can be expressed as c=f·λ. Therefore, the spacing W between the reception antennas 50 can be expressed as W=c/2f. In this case, the path difference D between the reflected waves R incident on the reception antennas 50A and 50B at the incidence angle θ can be expressed as D=W·sin θ, i.e. D=(c/2f)·sin θ.

Suppose the frequency used is f' [GHz], where f<f'. For example, f'=81 GHz. The wavelength λ' of the frequency f' is λ'=c/f'. When limiting the incidence angle θ, the phase difference resulting from the path difference D needs to be less than or equal to half of λ' (i.e. less than or equal to 180°). From this relationship, the path difference D between the reflected waves R can be expressed as D=W·sin θ>λ'/2=c/2f'. The relationship sin θ>c/2Wf' thus holds. Representing this expression using the center frequency f of the usable frequency band without using W yields sin θ>f/f'. Hence, in the case where the reflected waves are received from such an angle that exceeds the incidence angle θ when the frequency f' is used, the band part of the frequency used to transmit the transmission waves T may be changed.

The foregoing embodiments are not limited to implementation as the electronic device 1. For example, the foregoing embodiments may be implemented as a control method of a device such as the electronic device 1. For example, the foregoing embodiments may be implemented as a control program of a device such as the electronic device 1.

Although the foregoing embodiments describe the case where the number of transmission antennas 40 and the number of reception antennas 50 are both 2, the number of transmission antennas 40 and the number of reception antennas 50 may be any number of 2 or more in an embodiment. In the case where the number of transmission antennas 40 and the number of reception antennas 50 are 3 or more, one of the plurality of transmission antennas 40 and the plurality of reception antennas 50 may be a reference antenna. In this case, the phase of the transmission waves transmitted from each transmission antenna 40 may be controlled to perform beamforming, depending on the path difference D in a predetermined direction between the transmission waves transmitted from the reference antenna and the transmission waves transmitted from each of the other transmission antennas 40.

The electronic device 1 according to each of the embodiments may include, for example, only the controller 10 as a minimum structure. Alternatively, the electronic device 1 according to the embodiment may include at least one of the signal generator 22, the frequency synthesizer 24, the transmission controller 30, the power amplifier 36, and the transmission antenna 40 illustrated in FIG. 2, in addition to the controller 10. The electronic device 1 according to the embodiment may include at least one of the reception antenna 50, the LNA 52, the mixer 54, the IF unit 56, the AD converter 58, the distance estimator 62, the angle estimator 64, and the relative speed estimation unit 66 instead of or together with the foregoing functional parts, in addition to the controller 10. The electronic device 1 according to the embodiment can thus have any of various structures. In the case where the electronic device 1 according to the embodiment is mounted in the mobile body 100, for example, at least one of the foregoing functional parts may be installed in an appropriate location such as the inside of the mobile body 100. In an embodiment, for example, at least one of the transmission antenna 40 and the reception antenna 50 may be installed on the outside of the mobile body 100.

REFERENCE SIGNS LIST 1 electronic device
5 sensor
10 controller
12 memory
14 detection range determination unit
16 frequency selector
22 signal generator
24 frequency synthesizer
30 transmission controller
32 phase controller
34 power controller
36 power amplifier 40 transmission antenna
50 reception antenna
52 LNA
54 mixer
56 IF unit
58 AD converter
62 distance estimation unit
64 angle estimation unit
66 relative speed estimation unit
100 mobile body
200 object

The invention claimed is:

1. An electronic device comprising:
a plurality of transmission antennas configured to transmit transmission waves;
a plurality of reception antennas configured to receive reflected waves resulting from reflection of the transmission waves; and
a controller configured to detect an object reflecting the transmission waves, based on a transmission signal transmitted as the transmission waves and a reception signal received as the reflected waves,
wherein
the controller is configured to determine a band part used to transmit subsequent transmission waves in a predetermined frequency band, depending on an incidence angle of the reflected waves with reference to the reception antennas when the reception antennas receive the reflected waves; and
the controller is configured to determine the band part as a band part whose frequency is lower than or equal to a predetermined frequency in the predetermined frequency band, in the case where the incidence angle is greater than or equal to a predetermined angle.

2. The electronic device according to claim 1, wherein the incidence angle is an angle between a straight line corresponding to a direction in which the reflected waves are incident on the reception antennas and a perpendicular line to a direction in which the plurality of reception antennas are arranged.

3. The electronic device according to claim 1, wherein the controller is configured to determine the band part as a band part whose frequency is lower than a center frequency of the predetermined frequency band, in the case where the incidence angle is greater than or equal to a first angle.

4. The electronic device according to claim 3, wherein the controller is configured to determine the band part as a band part whose center frequency is lower than the center frequency of the predetermined frequency band, in the case where the incidence angle is greater than or equal to the first angle.

5. The electronic device according to claim 4, wherein the controller is configured to determine the band part as a band part whose center frequency is higher than or equal to the center frequency of the predetermined frequency band, in the case where the incidence angle is less than the first angle.

6. The electronic device according to claim 5, wherein the controller is configured to determine the band part as a band part whose center frequency is higher than or equal to a predetermined frequency that is higher than the center frequency of the predetermined frequency band, in the case where the incidence angle is less than a second angle that is less than the first angle.

7. The electronic device according to claim 1, wherein the controller is configured to determine the band part used to transmit the transmission waves in the predetermined frequency band, based on a position of the object.

8. The electronic device according to claim 7, wherein the controller is configured to dynamically vary the band part used to transmit the transmission waves in the predetermined frequency band, depending on the position of the object.

9. A control method of an electronic device, comprising:
transmitting transmission waves from a plurality of transmission antennas;
receiving reflected waves resulting from reflection of the transmission waves, by a plurality of reception antennas;
detecting an object reflecting the transmission waves, based on a transmission signal transmitted as the transmission waves and a reception signal received as the reflected waves;
determining, by a controller, an incidence angle of the reflected waves with reference to the reception antennas upon the reception antennas receiving the reflected waves, and determining, by the controller, a band part whose frequency is lower than or equal to a predetermined frequency in a predetermined frequency band upon the incidence angle being greater than or equal to a predetermined angle; and
transmitting subsequent transmission waves in the determined band part from the plurality of transmission antennas.

10. A non-transitory computer-readable recording medium storing computer program instructions, which when executed by an electronic device, cause a computer to:
transmit transmission waves from a plurality of transmission antennas;
receive reflected waves resulting from reflection of the transmission waves, by a plurality of reception antennas;
detect an object reflecting the transmission waves, based on a transmission signal transmitted as the transmission waves and a reception signal received as the reflected waves;
determine a band part used to transmit subsequent transmission waves in a predetermined frequency band, depending on an incidence angle of the reflected waves with reference to the reception antennas when the reception antennas receive the reflected waves; and
determine the band part as a band part whose frequency is lower than or equal to a predetermined frequency in the predetermined frequency band, in the case where the incidence angle is greater than or equal to a predetermined angle.

* * * * *